US008109113B2

(12) United States Patent
Takata et al.

(10) Patent No.: US 8,109,113 B2
(45) Date of Patent: Feb. 7, 2012

(54) POINT OF SALE METHOD AND APPARATUS FOR MAKING AND DISPENSING AERATED FROZEN FOOD PRODUCTS

(75) Inventors: Gary L. Takata, Buffalo Grove, IL (US); Brian R. Hill, Des Plaines, IL (US); Christopher K. Khoo, Lake in the Hills, IL (US); Timothy P. Hogan, Bristol, WI (US); John J. Hsing, Chicago, IL (US); Sam J. Ford, Mundelein, IL (US); Tim J. DeGroot, Northbrook, IL (US); William A. Miller, Buffalo Grove, IL (US); James Martin, Arlington Heights, IL (US); Christopher E. Peters, Palatine, IL (US)

(73) Assignee: Fluid Management Operations, LLC, Wheeling, IL (US)

( * ) Notice: Subject to any disclaimer, the term of this patent is extended or adjusted under 35 U.S.C. 154(b) by 363 days.

(21) Appl. No.: 12/408,380

(22) Filed: Mar. 20, 2009

(65) Prior Publication Data

US 2010/0075013 A1    Mar. 25, 2010

Related U.S. Application Data

(60) Provisional application No. 61/095,051, filed on Sep. 8, 2008.

(51) Int. Cl.
*A23G 9/00* (2006.01)

(52) U.S. Cl. ............................................. 62/345; 62/381

(58) Field of Classification Search ................ 62/1, 340, 62/342, 345, 71, 354, 381; 426/565, 572; 99/455, 461; 222/129, 144.5
See application file for complete search history.

(56) References Cited

U.S. PATENT DOCUMENTS 5,025,840 A * 6/1991 Tacke ............................ 141/253
(Continued)

FOREIGN PATENT DOCUMENTS

JP         10-295266 A      11/1998
OTHER PUBLICATIONS

International Search Report for related International application No. PCT/US2009/056159; ISR dated Apr. 19, 2010.

*Primary Examiner* — Mohammad Ali
(74) *Attorney, Agent, or Firm* — Miller, Matthias & Hull LLP

(57) ABSTRACT

An apparatus for making and dispensing frozen aerated products includes a rotating horizontal freeze plate with an upper surface for receiving a chilled aerated mix. The chilled aerated mix includes, in one embodiment, ice cream base that has been sufficiently aerated, and flavor. The apparatus further includes a scraper for scraping frozen aerated mix off of the rotating freeze plate. The scraper includes a body that forms an elongated semi-cylindrical channel. The apparatus also includes a plow for pushing the scraped, frozen and aerated mix through the channel towards a cup held by a cup lifter disposed at an end of the channel. The action of the plow pushes the scraped frozen aerated mix through the channel and into the cup resulting in a generally round scoop of scraped frozen aerated mix in the cup that resembles a serving scoop experienced at a traditional ice cream shop.

36 Claims, 30 Drawing Sheets

U.S. PATENT DOCUMENTS

| | | |
|---|---|---|
| 5,271,572 A | 12/1993 | Grandi |
| 5,292,030 A | 3/1994 | Kateman et al. |
| 6,952,928 B2 * | 10/2005 | Kateman et al. ............ 62/71 |
| 7,052,728 B2 * | 5/2006 | Kateman et al. ............ 426/515 |
| 7,726,136 B2 * | 6/2010 | Baxter et al. ............ 62/66 |
| 2003/0085237 A1 * | 5/2003 | Kateman et al. ............ 222/1 |
| 2005/0198990 A1 * | 9/2005 | Kateman et al. ............ 62/342 |
| 2006/0054614 A1 * | 3/2006 | Baxter et al. ............ 219/400 |
| 2006/0162347 A1 * | 7/2006 | Kateman et al. ............ 62/71 |
| 2006/0162348 A1 * | 7/2006 | Kateman et al. ............ 62/71 |
| 2007/0251260 A1 * | 11/2007 | Baxter et al. ............ 62/342 |

* cited by examiner

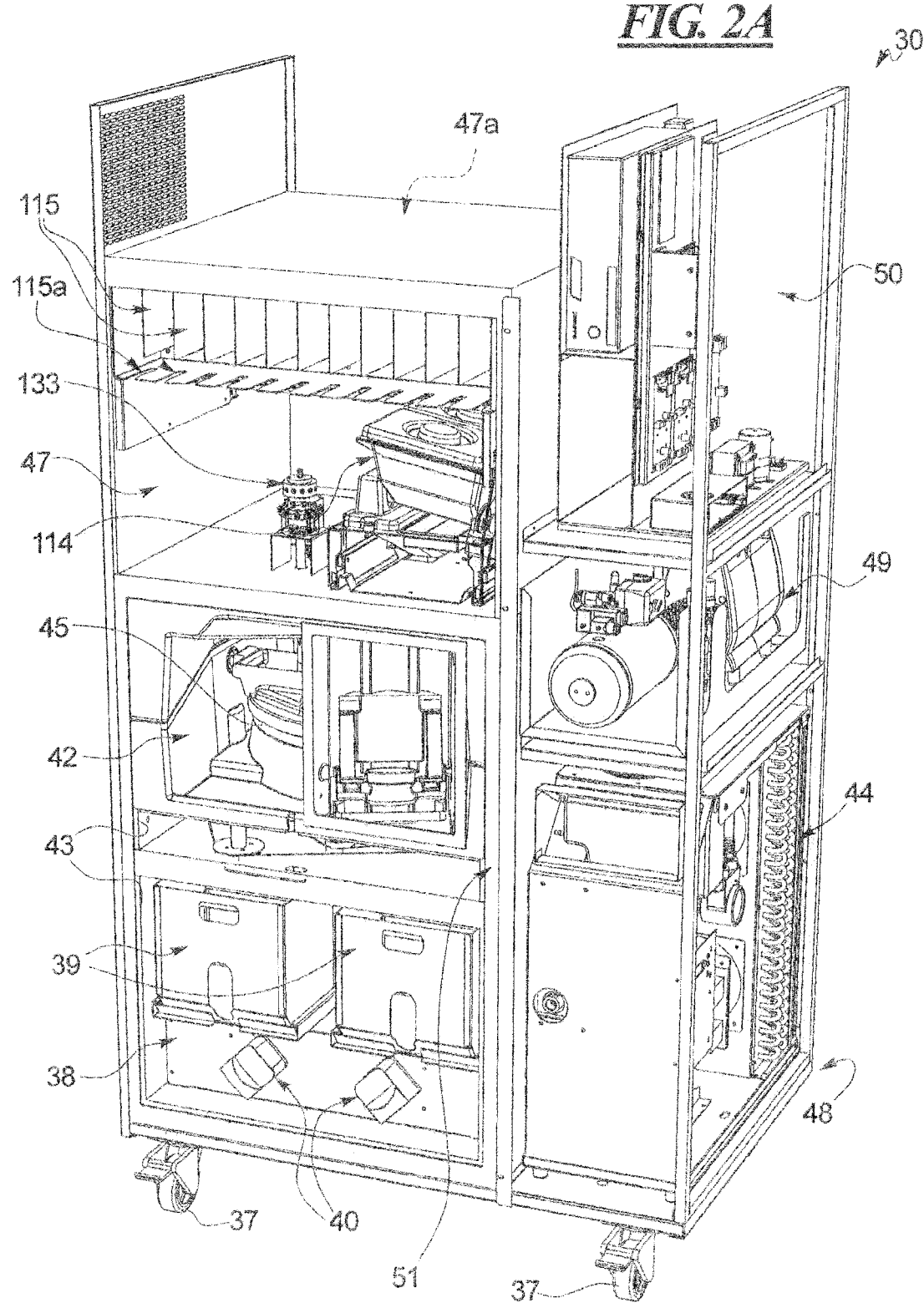

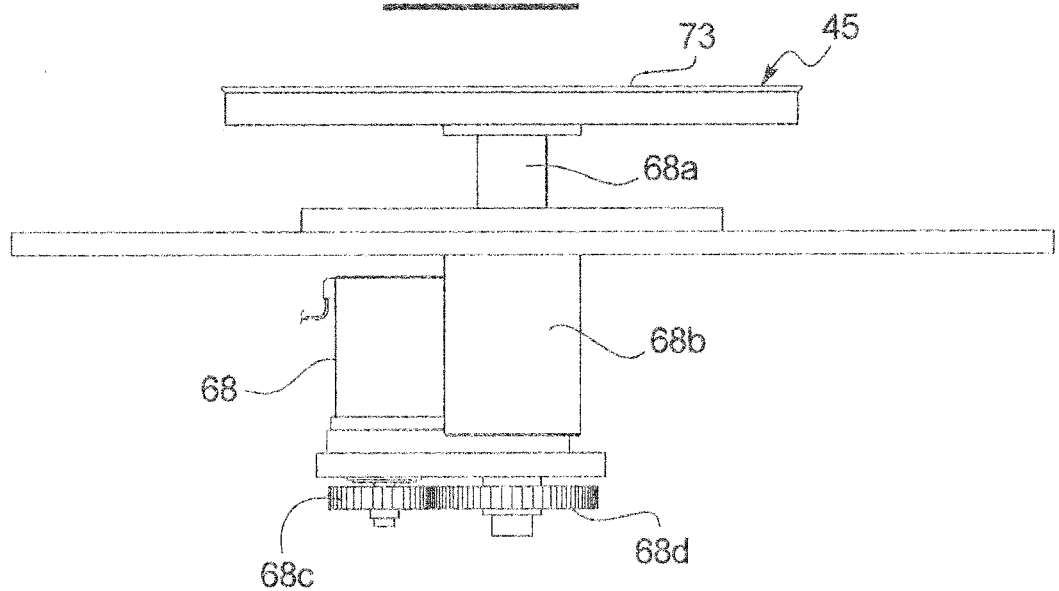
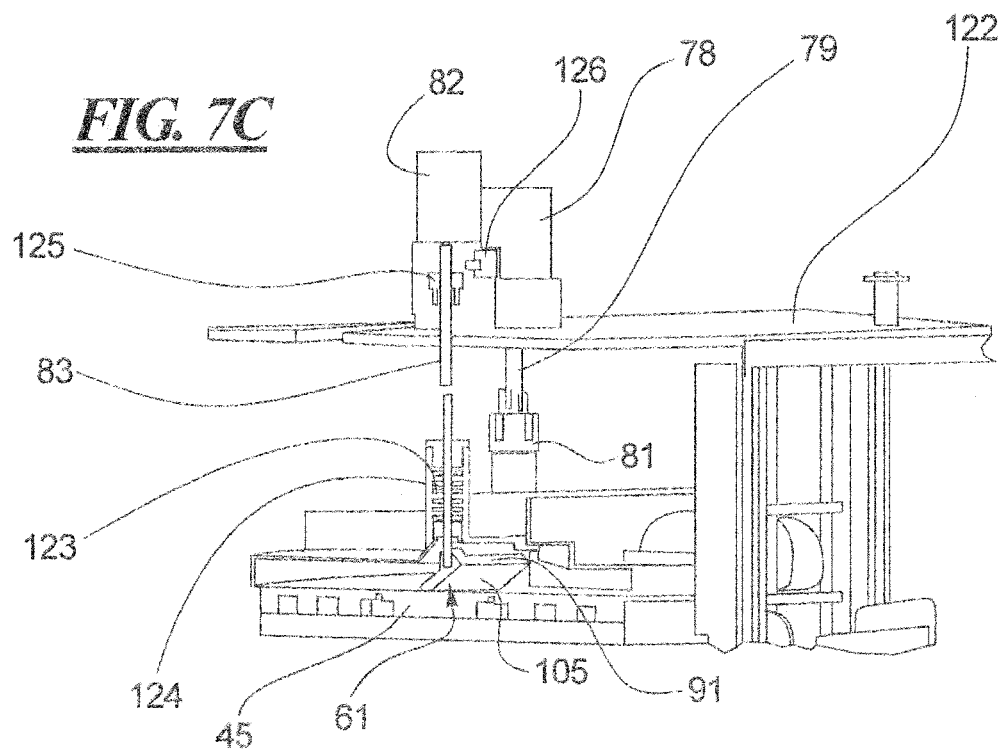

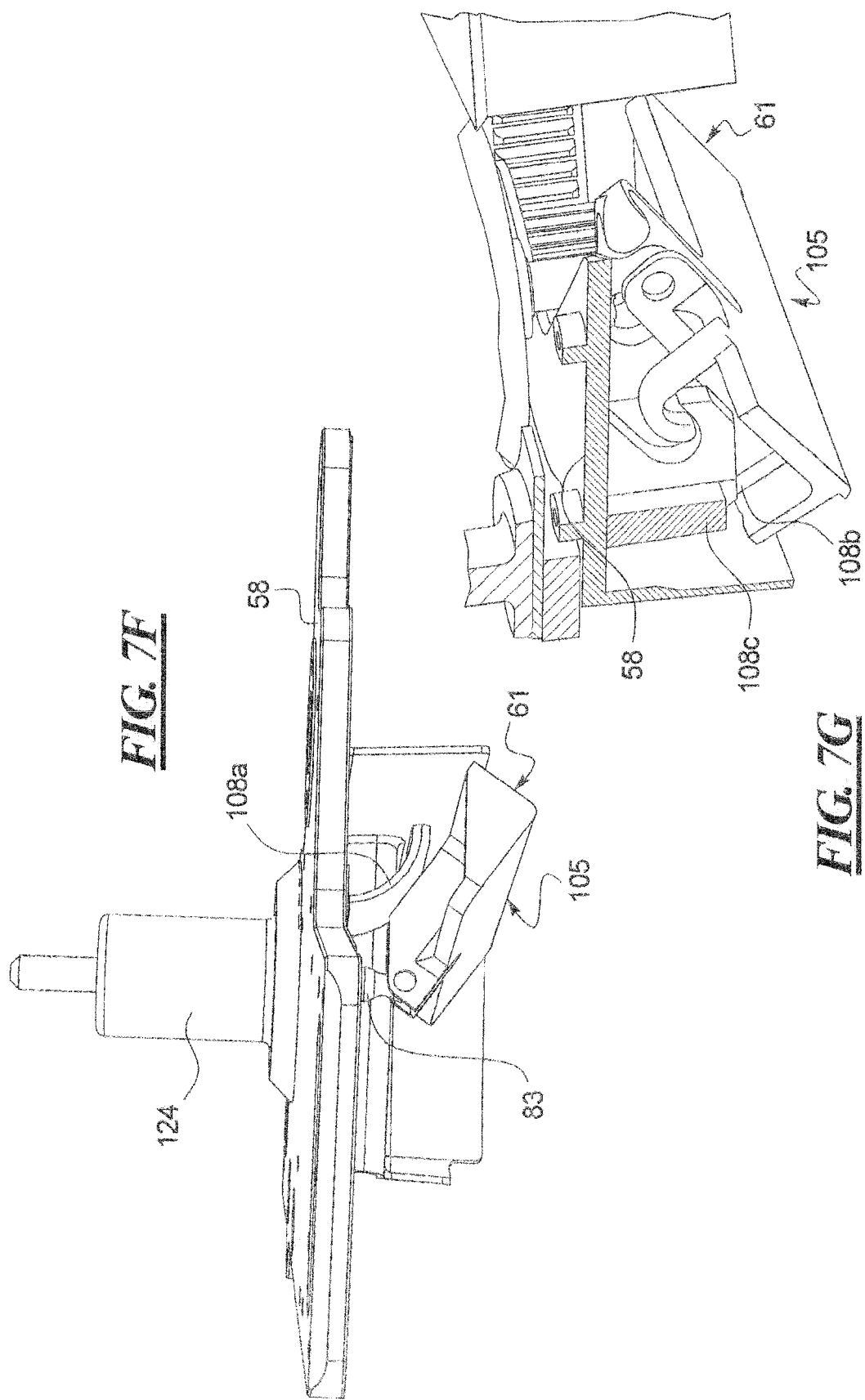

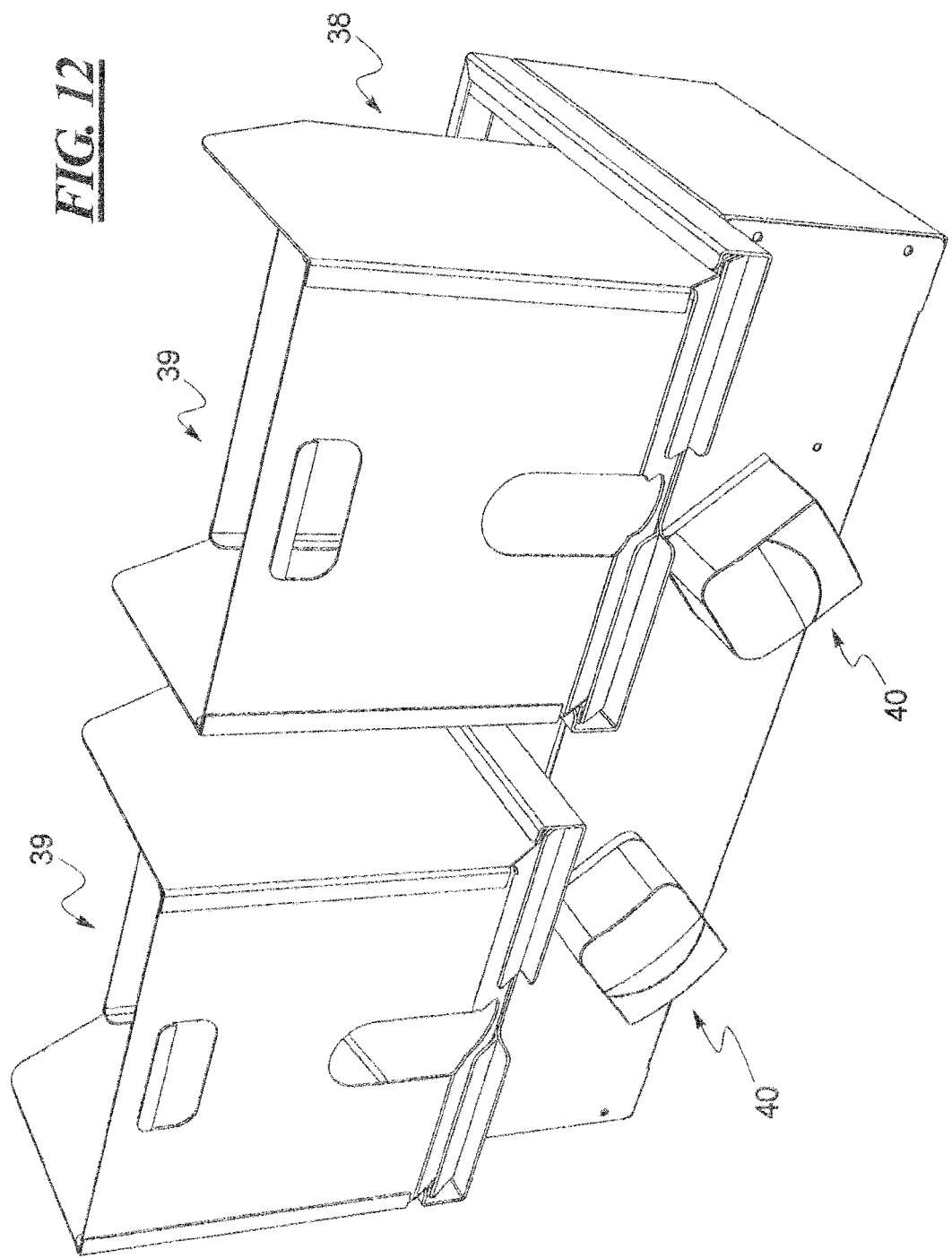

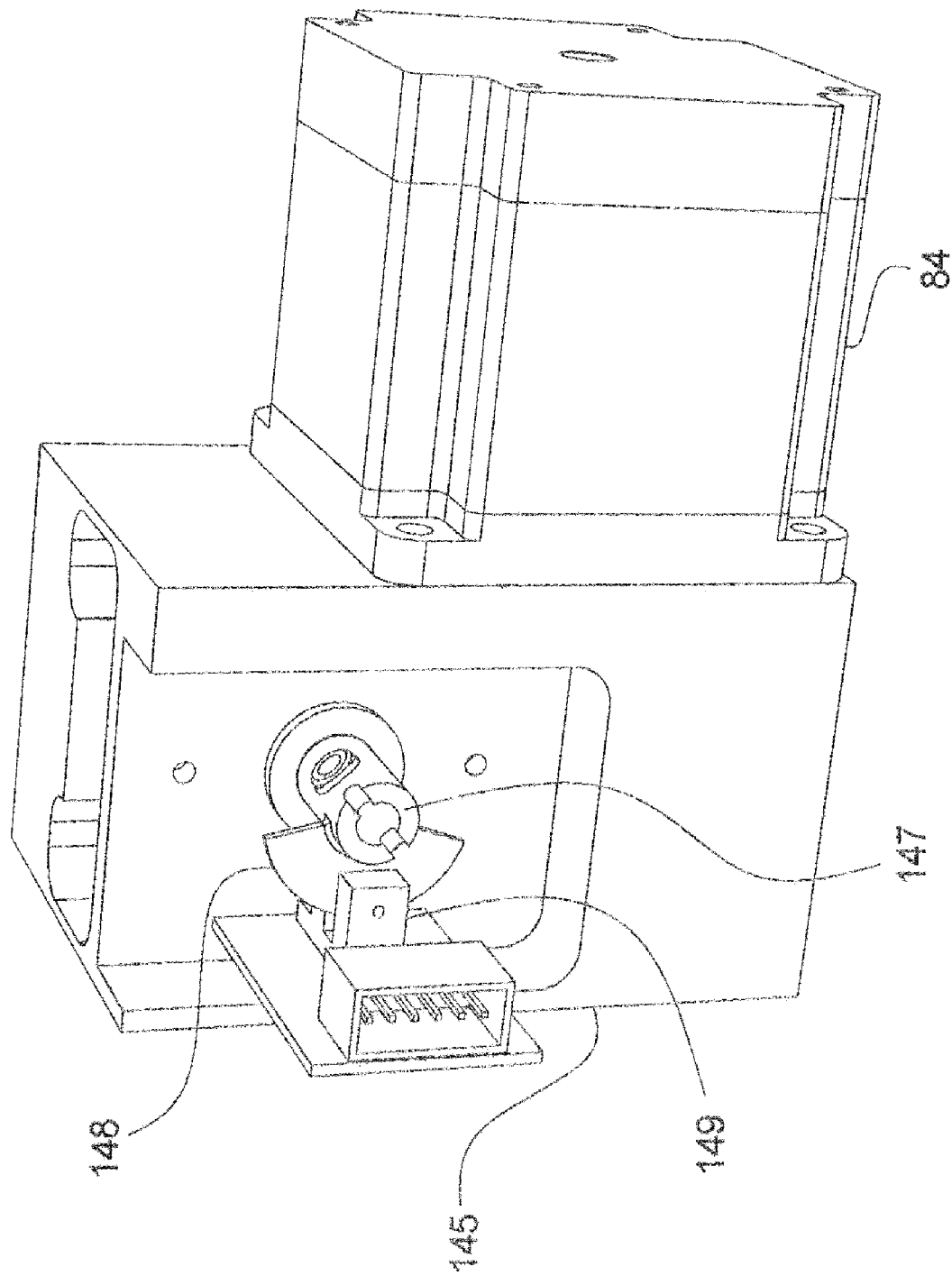

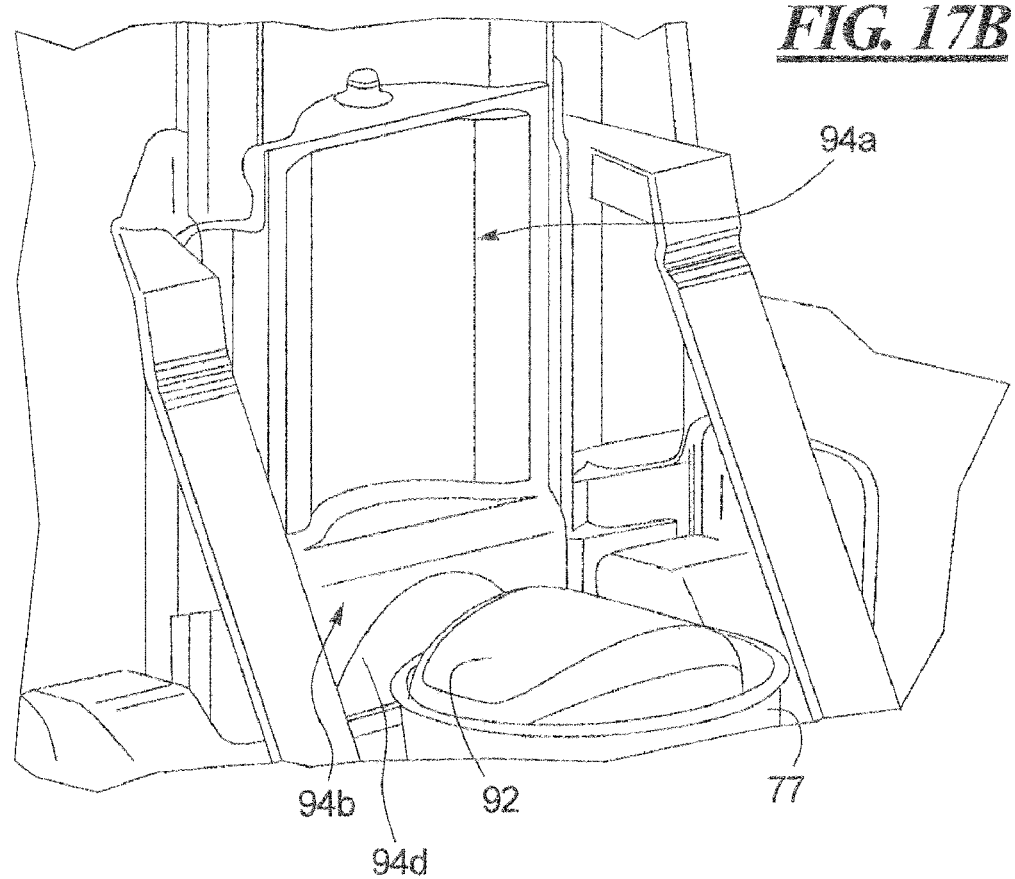
FIG. 17B
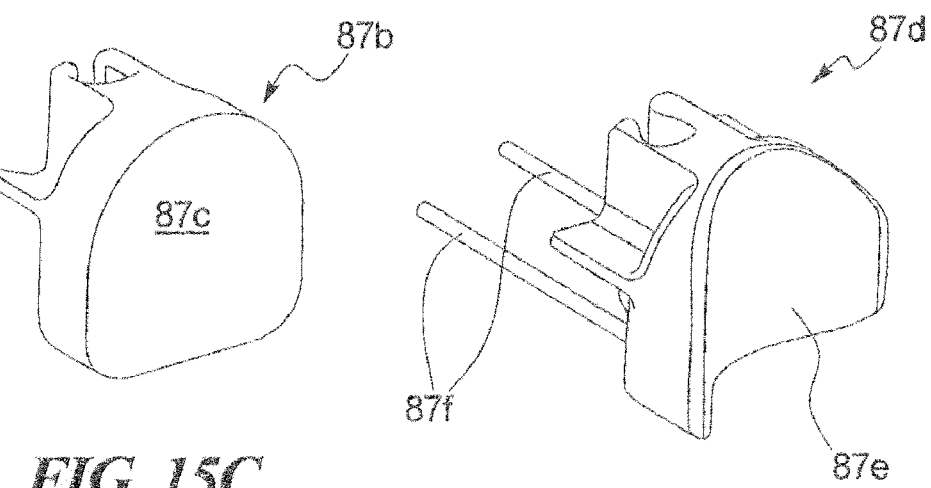
FIG. 15C
FIG. 15D

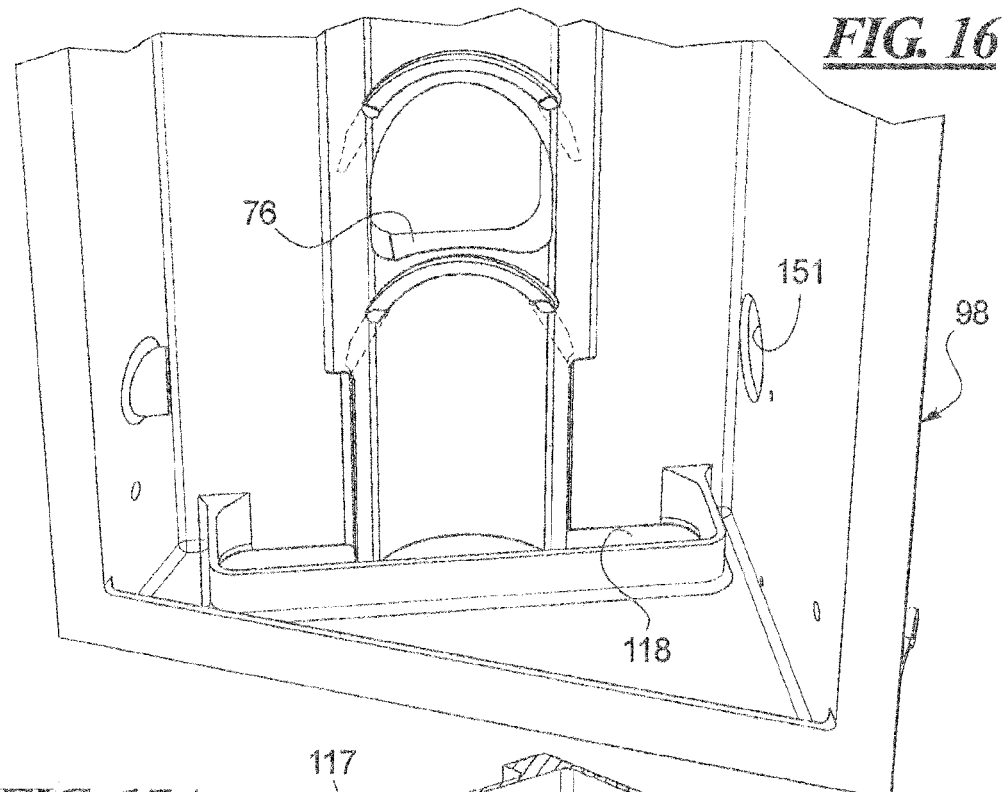
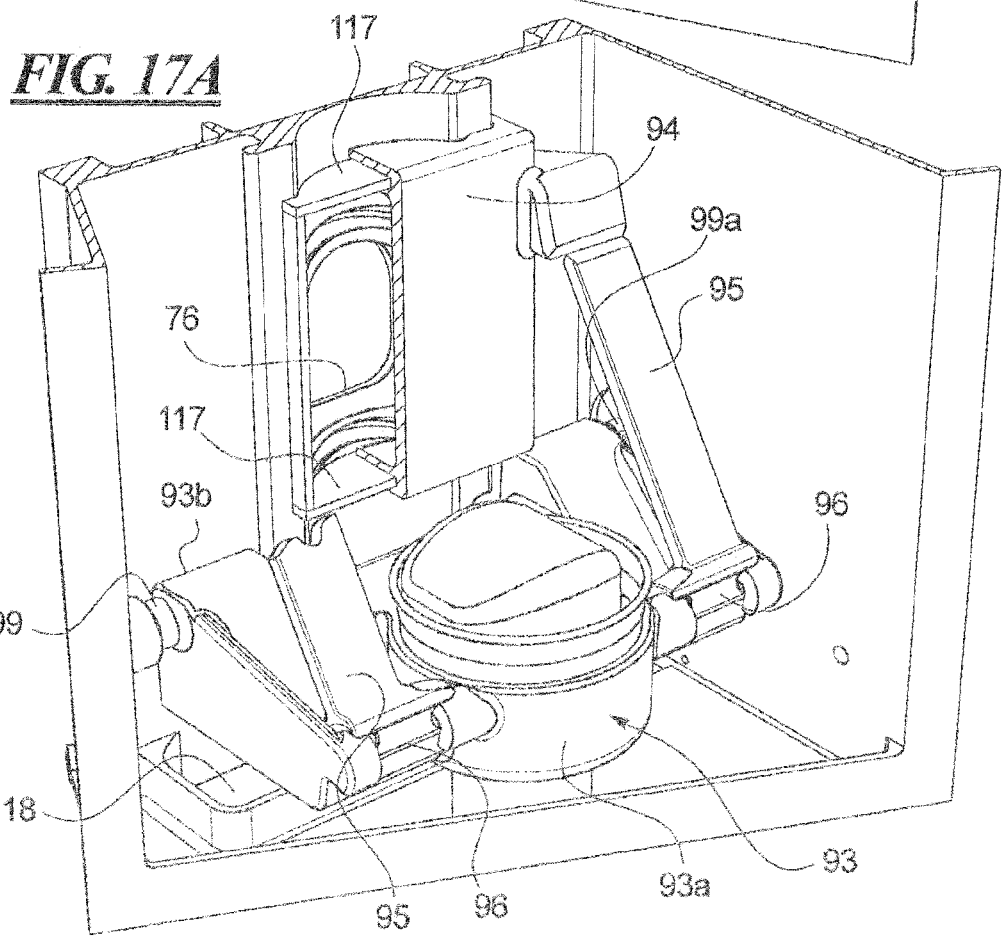

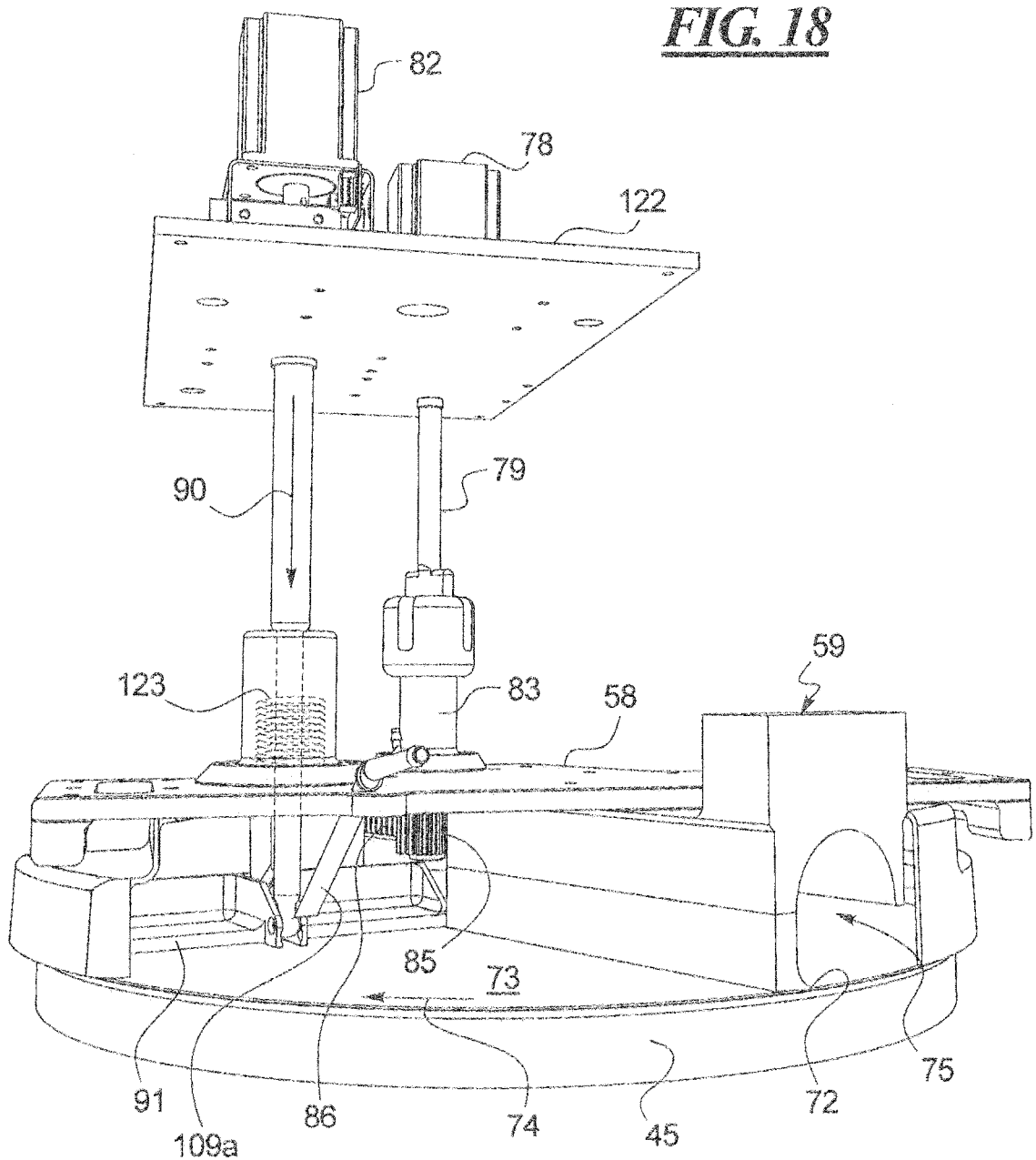

POINT OF SALE METHOD AND APPARATUS FOR MAKING AND DISPENSING AERATED FROZEN FOOD PRODUCTS

BACKGROUND

1. Technical Field

Point of sale methods and vending apparatuses are disclosed for producing and dispensing aerated frozen food products such as ice cream and frozen yogurt.

2. Description of the Related Art

The preparation of ice cream and other aerated frozen food products requires the combining of a liquid slurry or mix with air while freezing the aerated slurry. The process of adding air to the mix is known as whipping. When the mix is whipped inside a freezer or at sufficiently low temperatures, tiny air cells are created. These air cells increase the volume of mix, and the additional volume produced is referred to as "overrun." The higher the overrun, the less ice cream and the more air will be in the product. Premium ice cream has a very low overrun. Thus, the quality of the finished ice cream product depends on the amount of overrun as well as the manner in which the aerated mix is frozen and dispensed.

Currently, point of sale ice cream or frozen yogurt machines are limited to "soft serve"-type products and are usually dedicated to dispensing only one or two flavors of soft serve product and, in some cases, a combination of the two. For example, one soft serve machine will include two separate freezing chambers for making and dispensing chocolate and vanilla soft serve product. For other flavors, a second soft serve machine is required. The reason for the flavor limitation is that each freezing chamber contains a large volume of soft serve product intended for dispensing throughout the business day. In order to change or add new flavors, a freeze chamber must be emptied and cleaned before the new soft serve flavor can be made.

Another problem associated with point of sale soft serve machines relates to sanitation. As with any retail food appliance, the containers of pre-flavored mix from which the aerated soft serve product is made must be sanitary. The use of additional machines for providing more flavors increases the labor costs associated with sanitizing each machine. While high volume businesses have sales to justify the presence of several soft serve dispensing machines dispensing for a variety of products and flavors, many smaller businesses either cannot afford costs or labor associated with additional machines or do not have the floor space required for additional machines.

Further, because soft serve products are pre-made in quantities intended to last through the business day, most of the product remains in the chamber after formation and until it is dispensed hours later. Because soft serve ice cream or yogurt tastes better when it is fresh, the quality of the soft serve product may be compromised if sales are slow.

Point of sale soft serve machines are also difficult and time consuming to clean and maintain. Proper cleaning requires the machine to be purged of remaining product, and all interior walls, pumps and other parts that come into contact with the product must be cleaned and sanitized to prevent bacteria growth. Such cleaning operations are costly in terms of labor, down time, and product waste.

In addition to the problems associated with soft serve ice cream and frozen yogurt dispensers described above, there is a demand for traditional ice creams that cannot be made by a conventional soft serve dispensing machine. Traditionally, these higher-quality ice creams are produced in five gallon quantities thereby requiring an ice cream shop to have expensive elongated open-top freezers for the display and serving of the various ice cream flavors. While traditional ice creams with less overrun have a reasonably long shelf life, the cost of the freezers and the energy use can be prohibitive to many small businesses. To alleviate this problem, point-of-sale gourmet ice cream dispensing machines are being developed. U.S. Pat. No. 5,433,967 discloses a machine for making a single serving wherein the aerated product is frozen in and dispensed from a tube structure. U.S. Pat. No. 5,727,713 discloses a disposable conduit with an air mixing chamber and side branches for adding flavors. While not environmentally sound, the disposable conduit provides certain sanitary benefits.

U.S. 2006/0162348, U.S. 2006/0162347, U.S. Pat. No. 7,131,279, U.S. Pat. No. 7,052,728, U.S. Pat. No. 6,952,928 and U.S. Pat. No. 6,698,228, commonly assigned to MooBella LLC of Taunton, Mass., USA, all disclose point-of-sale ice cream vending machines that utilize a rotating horizontal freeze plate for the distribution of the aerated mix and various means for scraping the frozen aerated mix off of the freeze plate prior to placement of the frozen aerated mix into a container for the customer.

However, the above-described MooBella machines, while clearly providing advantages over the prior art, still suffer from several deficiencies. First, while the MooBella machines provide a more traditional ice cream product that serves as a distinct alternative to a soft serve product, the shape of the dispensed MooBella product is roughly in the form of an elongated cylinder, as opposed to a rounded scoop, like those served in traditional ice cream shops. Thus, the MooBella vending machines fall short of accurately imitating the look of scooped ice cream served by traditional ice cream shop. Second, the MooBella machines are difficult, time-consuming and therefore costly to sanitize at the end of each business day. Multiple parts must be disassembled, cleaned and reassembled. Therefore, a point-of-sale ice cream vending machine that is easier to sanitize in compliance with local health department codes is needed. Further, improvements in terms of air distribution and mixing, flavor distribution and mixing, solid material or "mix-ins" distribution and mixing as well as product delivery time or speed and dependability are also required.

SUMMARY OF THE DISCLOSURE

In this disclosure, the above deficiencies are addressed and improved methods and apparatuses for producing and dispensing ice cream or aerated frozen confectionery products at a point-of-sale are disclosed.

One disclosed apparatus for making and dispensing frozen aerated products comprises a rotating horizontal freeze plate with an upper surface for receiving a chilled aerated mix. The chilled aerated mix comprises, in one embodiment, ice cream base that has been sufficiently aerated and combined with one or more flavors. The horizontal freeze plate rotates about its central axis. The apparatus also comprises a spreader body for distributing the chilled aerated mix on the rotating freeze plate. The spreader body extends radially across at least a portion of the upper surface of the freeze plate. The apparatus further comprises a scraper for scraping frozen aerated mix off of the rotating freeze plate. The scraper comprises a scraper blade with a leading edge that extends radially across the portion of the freeze plate and that engages the upper surface of the freeze plate. The scraper blade is directed opposite the direction of rotation of the freeze plate. The scraper further comprises a body that forms an elongated semi-cylindrical channel above the scraper blade that extends radially across the freeze plate for the collection of scraped, frozen and aerated mix. The apparatus also comprises a plow for pushing the scraped, frozen and aerated mix through the channel towards a cup held by a cup lifter disposed at an end of the channel. The action of the plow pushing the scraped frozen aerated mix through the channel and directly into the cup results in a generally round scoop of scraped frozen aerated mix in the cup that closely resembles a serving scoop experienced at a traditional ice cream shop.

In a refinement, the scraper and the spreader body are uniformly biased against the upper surface of the freeze plate by a pre-loaded hold-down plate. In further refinement of this concept, the hold-down plate is connected to and extends between two vertical posts disposed on diametrically opposed sides of the freeze plate. Each post is connected to a vertical cam.

In a refinement, the vertical posts and consequently, the hold-down plate, are biased upward by a pair of springs. The vertical cams move the posts and hold-down plate from a released (upward) position for disassembly and cleaning to a clamped (downward) position for making the scoop.

In a further refinement, the vertical cams are disposed beneath the freeze plate and are linked together by a pulley and lever system so both cams can be moved simultaneously from the released to the clamped positions and vice versa upon the movement of the lever.

In a refinement, the spreader body includes one or more rounded supports that support the spreader edge of the spreader body a fixed distance or gap above the rotating freeze plate. In one refinement, the spreader edge is disposed between two rounded end supports. In another refinement, a middle rounded support is provided to support the spreader edge uniformly above the rotating freeze plate and to prevent any bowing of the spreader edge towards the freeze plate as the spreader edge is biased towards the freeze plate.

In another refinement, the cup lifter comprises a cup holder that, in turn, comprises a front side and a rear side. The rear side of the cup holder is pivotally connected to a frame. The frame comprises an opening in alignment with the channel of the scraper. The front side of the cup holder is linked to a door that covers the channel when the cup lifter is in a first position. The door is slidably connected to the frame and movable to a second position above the opening which causes the cup holder to pivot upward in alignment with and covering the opening with a cup when a cup is received in the cup holder.

In a refinement, the door of the cup lifter apparatus includes a lower edge that is used to dislodge a scoop from the plow in the event the scoop adheres to the face of the plow as it is been pushed into the cup by the plow. In operation, the plow is extended to push the scraped, aerated frozen mix towards the cup to form a scoop. Once the plow is in the fully extended position, movement of the plow and cup is delayed for predetermined period of time. The plow is then retracted partially and the door is partially lowered so that the lower edge of the door engages any product that may be adhering to the face of the plow. After dislodgment, the plow is retracted to a cleaning position where the door is lowered fully and wiper elements on the door clean the face of the plow as the door proceeds downward to the closed position. The plow is then fully retracted back through the channel in preparation for the next dispense.

Other means for dislodging of frozen ice cream scoop from the plow face include using air pressure, a flexible plow face, a plow face that includes an expandable bladder, a plow face with an expandable/retractable piston member and/or heated plow face.

In a further refinement of this concept, the door comprises a wiper element for wiping the plow when the door moves from the second to the first positions and when the plow is disposed at the opening in the frame after the plow has pushed the product into the cup.

In another refinement, the spreader body comprises a spreading edge and a cleaning edge. The spreader body is pivotally connected to a rod. The spreader body is movable between a spreading position where the spreading edge engages the upper surface of the freeze plate and a cleaning position where both the cleaning edge and spreading edge engage the upper surface of the freeze plate.

In another refinement, the spreading edge comprises a spreader blade disposed between two rounded end supports. The spreader blade is recessed with respect to the rounded end supports so that, in the spreading position, the spreader blade is supported a fixed distance or gap above the upper edge of the freeze plate by the rounded end supports. In a further refinement of this concept, the gap between the spreader blade and the upper surface of the freeze plate is about 0.012" when the spreader body is in the spreading position thereby providing for a 0.012" thick layer of aerated mix on the freeze plate. However, with the gap thickness can vary. For example, the gap thickness can be less than 0.012" and additional rotations of the freeze plate may be required to produce an adequate serving size. Alternatively, a gap thickness of greater than 0.012" may be employed in fewer rotations of the freeze plate may be required to produce an adequate serving size. Those skilled in the art will be aware that the gap thickness or aerated mix layer thickness, freeze plate temperature, freeze plate speed and qualities of the aerated mix may all be varied to produce the desired results.

In a refinement, when the spreader body moves from the cleaning position to the spreading position, the rod moves vertically upward thereby causing the cleaning edge to pivot upward away from the freeze plate as the spreader body engages an abutment, resilient member or spring biased member that holds the spreading edge against the upper surface of the freeze plate in the spreading and cleaning positions. In one refinement, magnets of opposing polarities are used to bias the spreader edge of the spreader body against the freeze plate in both the spreading and cleaning positions.

In a refinement, the freeze plate, spreader, scraper and plow are disposed within a liner. The liner comprises a drain for the release of cleaning water and debris.

In a refinement, the apparatus comprises a frame. The frame supports a first insulated compartment for the storage of base material of the mix. The first insulated compartment is in communication with a compressor for maintaining the first insulated compartment within a first temperature range. The frame also supports a second insulated compartment for accommodating the freeze plate, scraper, spreader body and plow (i.e., the "ice cream factory"). The second insulated compartment is in communication with the compressor for maintaining the second insulated compartment within a second temperature range. The freeze plate is linked to its own dedicated compressor or "chiller." The frame also supports a third compartment for accommodating liquid flavorings and solid "mix-in" materials (e.g., candy, granola, chocolate, etc.). Typically, the third compartment may be maintained at a higher temperature (e.g., 55° F.+/−5° F.) than the first and second compartments (e.g., 36° F.+/−3° F.). As a result, the third compartment may not require a separate compressor and baffles may be employed to control the flow of chilled air between the first, second and third compartments. Preferably, one compressor may be employed to cool all three compartments that are in need of cooling.

By way of example only, the first compartment that accommodates the base materials may be conveniently disposed towards the bottom of the frame and maybe in direct and primary communication with the compressor. The second compartment housing the ice cream fabrication equipment may be disposed on top of the first compartment. Or more baffles may be employed to provide the airflow to between the first and second compartments. The flavors and mix-in materials may be disposed in the third compartment above the second compartment. Baffles and conduits may be employed to provide controlled communication of chilled air between the first and third compartments in between the second and third compartments.

Further, it is desirable to control humidity in the second and third compartments. Thus, these compartments may be vented to the atmosphere and a desiccant module may be employed in at least the second compartment for humidity and frost reduction. The desiccant module may be employed to reduce the humidity of chilled air exchange between the second and third compartments The frame also supports an additional compartment for accommodating electronic components. This additional compartment preferably comprises a vent for releasing heat.

In another refinement, the second compartment is connected to a blower by a one-way valve permitting air from the blower to enter the second compartment from the blower. The second compartment further comprises an outer window that isolates the second compartment and maintains the second compartment at a pressure greater than one atmosphere during the making of the scoop of frozen, scraped aerated mix.

Methods for making and dispensing ice cream at a point of sale vending machine are also disclosed. One disclosed method comprises: rotating a freeze plate; providing a stream of chilled base; injecting air into the stream of chilled base to provide a stream of aerated chilled base; injecting one or more flavors into the stream of aerated chilled base to provide a stream of aerated mix; delivering the stream of aerated mix onto the rotating freeze plate; spreading the aerated mix onto a portion of the rotating freeze plate with a spreader body that extends radially across the portion of the freeze plate to provide a layer of frozen aerated mix; scraping the frozen aerated mix off of the freeze plate with a scraper that comprises a scraper blade with a leading edge that extends radially across the portion of the freeze plate and that engages the freeze plate and is directed opposite a direction of travel of the freeze plate, the scraper further comprising a body that forms an elongated semi-cylindrical channel above the scraper blade and that extends radially above the freeze plate; accumulating scraped frozen aerated mix in the channel; and, forming a rounded portion from the accumulated frozen aerated mix by extending a plow though the channel towards a cup held in place by a cup lifter.

Another disclosed method comprises: rotating a freeze plate; starting a first air compressor; starting first and second pumps; pulling a spreader body and scraper downward and into engagement with the rotating freeze plate; pumping a stream of chilled base with the first pump; injecting air into the stream of chilled base with the first air compressor to provide a stream of aerated chilled base; injecting at least one flavor into the stream of aerated chilled base with the second pump to provide a stream of aerated mix; delivering the stream of aerated mix onto the rotating freeze plate in front of the spreader body; while the freeze plate rotates, spreading the aerated mix onto a portion of the rotating freeze plate with the spreader body that extends radially across the portion of the freeze plate to provide a layer of frozen aerated mix; while the freeze plate rotates, scraping the frozen aerated mix off of the freeze plate with a scraper that comprises a scraper blade with a leading edge that extends radially across the portion of the freeze plate and that engages the freeze plate and is directed opposite a direction of travel of the freeze plate, the scraper further comprising a scraper body that forms an elongated semi-cylindrical channel above the scraper blade and that extends radially above the freeze plate; accumulating scraped frozen aerated mix in the channel; shutting off the first and second pumps and air compressor; tilting the spreader body downward so that a cleaning edge of the spreader body engages the rotating freeze plate; stopping the rotation of the freeze plate; tilting a cup into position at an end of the channel opposite along a periphery of the freeze plate for receiving accumulated scraped frozen aerated mix; forming a rounded scoop-like portion from the accumulated frozen aerated mix by extending a plow though the channel to push the accumulated frozen aerated mix towards the cup; wiping the plow; retracting the plow back through the channel; and, tilting the cup back to an upright position.

In a refinement, the spreading of the aerated chilled mix occurs over about ⅔ of a rotation of the freeze plate.

In a refinement, the scraping of the frozen aerated mix occurs over about ⅓ of a rotation of the freeze plate.

In another refinement, the entire ice cream scoop fabrication/dispensing/freeze plate cleaning operation can be performed in about three rotations of the freeze plate.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 2A is another perspective view of the machine illustrated in FIG. 1 with the outer housing panels removed;

FIG. 7B is a side plan view of the freeze plate, stepper motor, gearbox and associated coupling assembly;

FIG. 7C is a side perspective view illustrating retraction of the spreader shaft to an upward or spreading position thereby causing the cleaning edge of the spreader body to pivot upward away from the freeze plate;

FIG. 7F is a side view illustrating an alternative arrangement for the spreader assembly which includes a resilient biasing member for biasing the rear end of the spreader body against the freeze plate;

FIG. 7G is a side view illustrating an alternative arrangement for the spreader assembly which includes two pairs of opposing magnets, one magnet of each pair associated with the cover and another magnet of each pair associated with the rear end of the spreader body, for biasing the rear end of the spreader body against the freeze plate;

FIG. 12 is a perspective view of the base storage modules and associated pumps;

FIG. 15B is a perspective view of the cup lifter motor, home sensor and encoder wheel;

FIG. 15C is a perspective view of a plow element with a soft, elastomeric face for avoiding sticking of the ice cream portion to the plow face;

FIG. 15D is a perspective view of a plow element with a soft, elastomeric face in communication with pressurized air that functions as a bladder for releasing the ice cream portion into the cup;

FIG. 16 is a partial perspective illustration of the frame of the cup lifter, schematically illustrating the location of the plow wiper elements and the scrap collection trough disposed below the channel access opening;

FIG. 17A is another partial and sectional view of the cup lifter mechanism shown in FIG. 16, particularly illustrating the relationship between the cup holder, elevator door and access opening to scraper body channel;

FIG. 17B-17F illustrates an alternative cup lifter mechanism wherein the door is equipped with lower blade for disengaging the ice cream portion from the plow face;

FIG. 18 is a partial perspective view of the ice cream serving fabrication module, particularly illustrating the mechanism that moves the spreader body into the cleaning position shown in FIG. 18;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
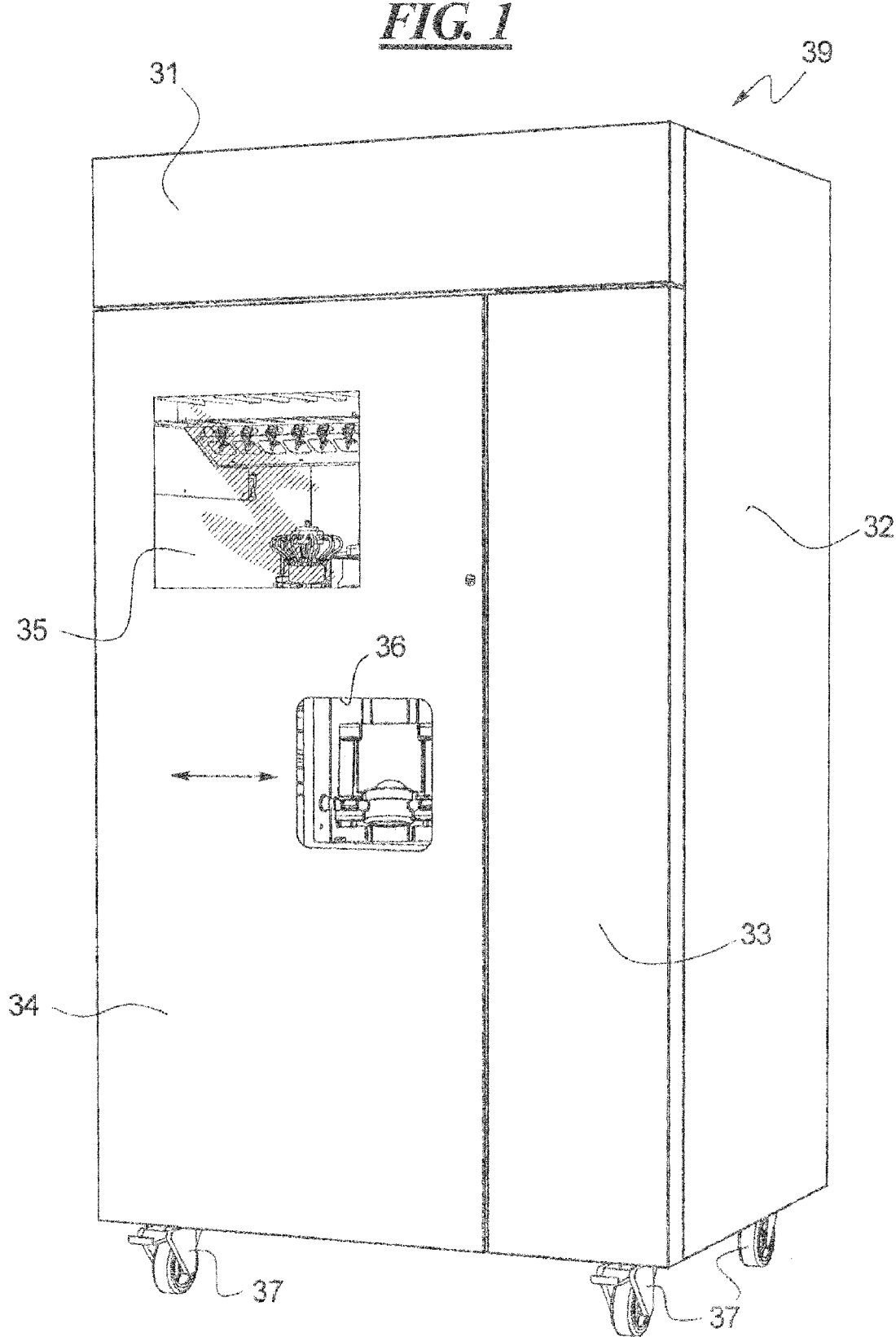
FIG. 1 is a left front perspective view of a stand-alone ice cream making and dispensing machine made in accordance with this disclosure and intended for use in a retail setting.

Turning first to FIG. 1, a stand-alone ice cream/frozen yogurt fabricating and dispensing machine 30 is illustrated and that is designed for a retail setting. The machine 30 includes outer panels 31-34 as shown in FIG. 1 which cover a skeleton frame structure as illustrated in FIG. 2A. The panel 34 serves as a door with operations viewing window 35 and a sliding access door/window 36 which provides either automated or manual access to the cup lifter/serving dispenser as described below. Wheels 37 may be provided to facilitate installation and movement of the machine 30 and for cleaning the floor beneath the machine 30. The daily maintenance/sanitization practices will be described below in connection with FIGS. 3-4.

Figure 2B:
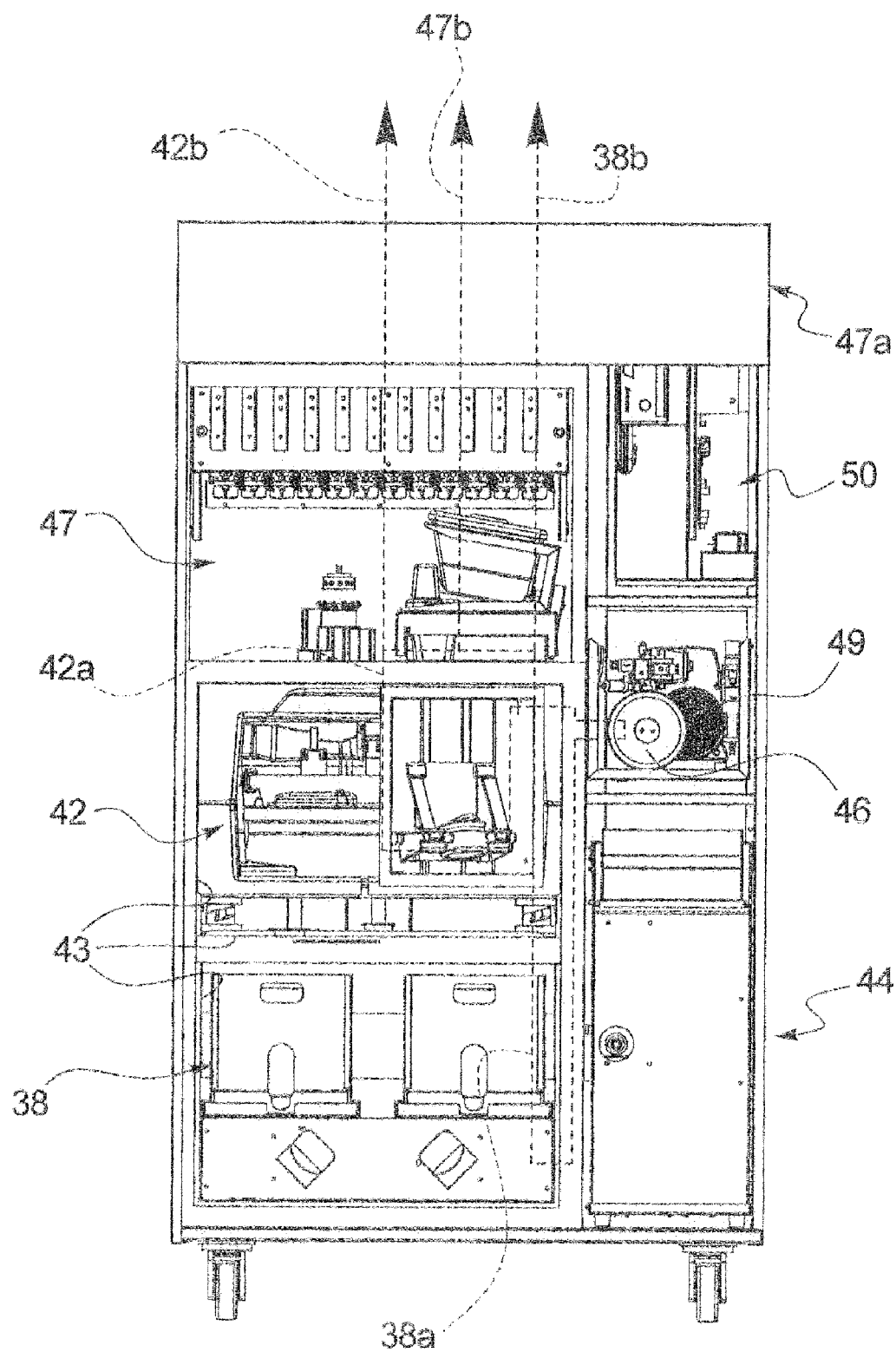
FIG. 2B is front plan view of the machine illustrated in FIG. 1 with the outer housing panels removed and the chilled air circulation and warm air venting shown schematically.
Figure 2D:
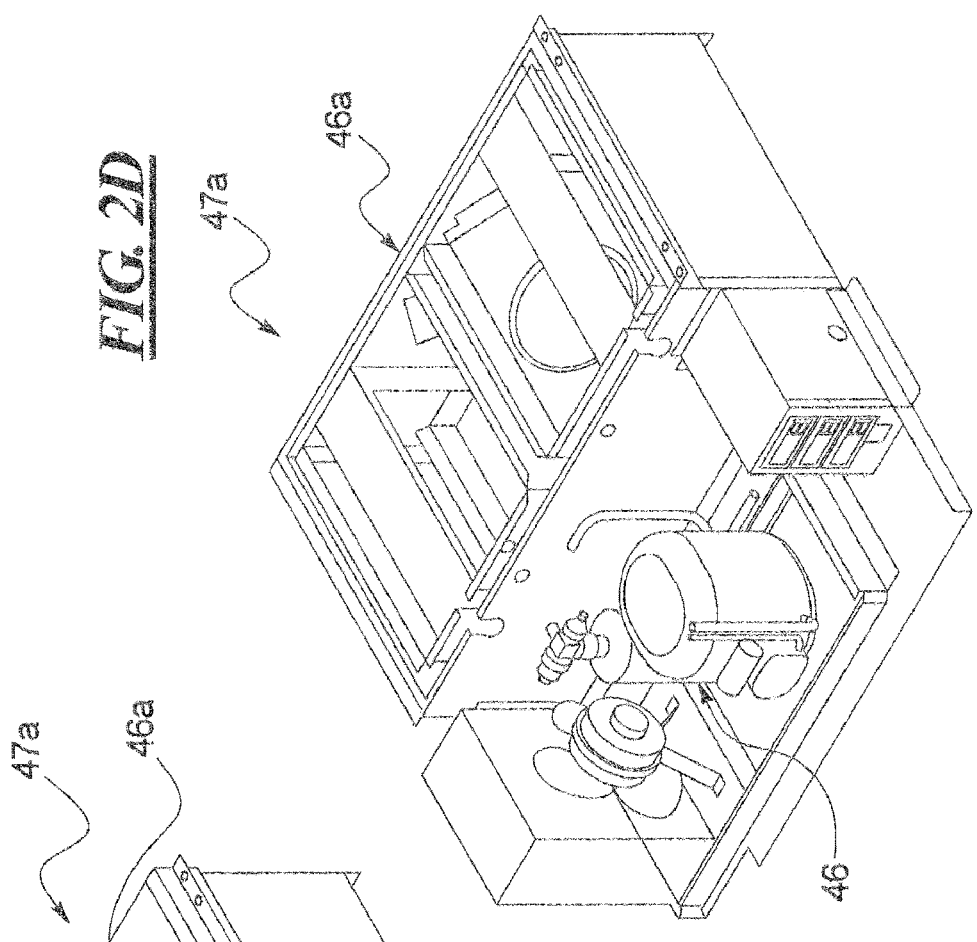
FIG. 2C and FIG. 2D are perspective views of the sealed refrigeration module disposed above the flavor module.
Figure 2C:
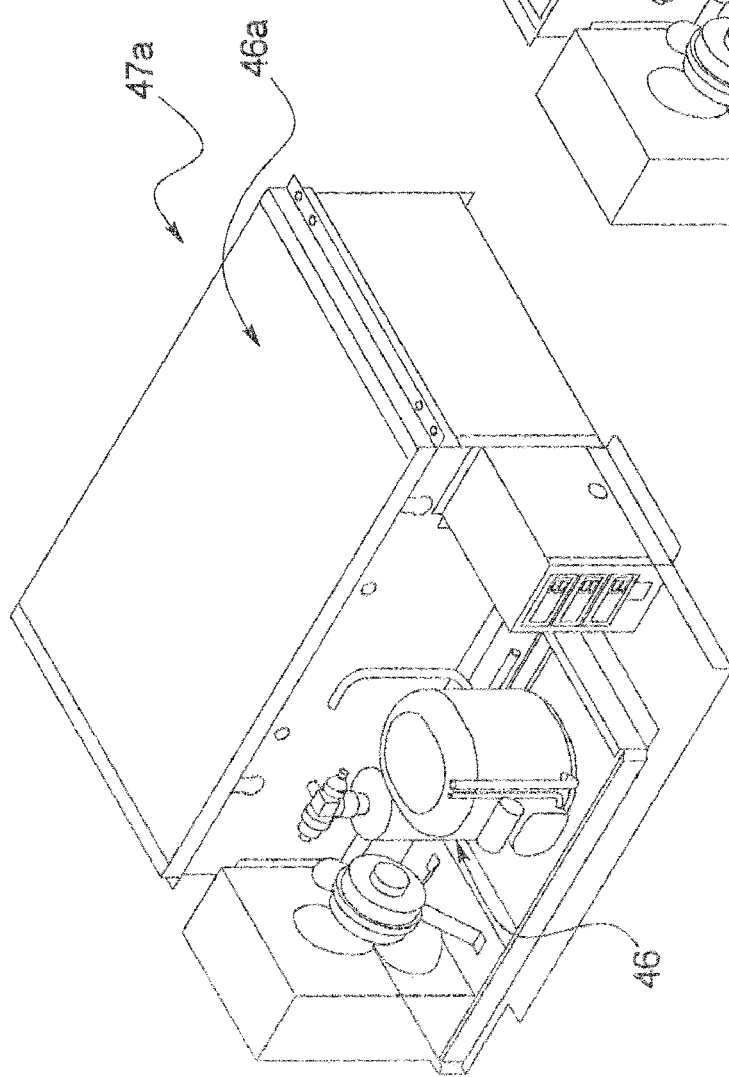

FIG. 2A illustrates the skeleton frame and modular structure of the dispenser 30. A lower compartment or module 38 accommodates base containers 39 and the pumps 40 used to deliver base to the serving fabrication module or "ice cream factory" compartment 42. The modules/compartments 38/42 are insulated and chilled by at least one dedicated compressor 46 shown in FIGS. 2C-2D. The base materials are preferably maintained at a temperature of less than about 40° F. Accordingly, the base compartment 38 and ice cream factory compartment 42 are preferably maintained at temperatures of less than about 40° F. An ideal temperature range for both of these compartments 38, 42 is 36° F.+/−3° F. Thus, the compartments or modules 38, 42 are provided with insulation shown schematically at 43. The upper compartment 47 accommodates the liquid flavors, pumps and solid "mix-in" materials. The compartment 47 should also be cooled, but to within a temperature range that is higher than the temperature range of the compartments 38, 42. A suitable temperature range for the upper compartment 47 is 55° F.+/−5° F. The sealed refrigeration module 47a that is disposed on top of the flavor module (FIG. 2A) and which is illustrated in FIGS. 2C-2D cools the compartments 38, 42, 47.

A chiller mechanism 44 provides liquid coolant to the rotating freeze plate 45. Suitable temperature for the freeze plate is about 10° F. As noted above, the compressor 46 is used for cooling the compartments 38, 42 (33-39° F.) as well as the flavor module 47 (50-60° F.). The air compressor or condenser 46 in combination with the evaporator unit 46a (FIGS. 2C-2D) are used to aerate the chilled base material and/or chilled base/flavor mix. The electronics/control module is shown at 50 in FIGS. 2A-2B as well as FIG. 13. The compressor 46/evaporator 46a cools air that is delivered to the lower compartment 38 that houses the base as well as to the middle compartment 42 that houses the ice cream manufacturing complements ("the ice cream factory"). Chilled air is also communicated to the upper compartment 47 that houses the flavorings and solid mix-in materials. However, the air used to cool the compartment 47 may be communicated from the middle and lower compartments 42, 38. One suitable airflow scheme is illustrated in FIG. 2B.

Specifically, chilled air is communicated to the lower compartment 38 from the refrigeration module 47a as indicated by the flow path 38a. Eventually, at least some of the chilled air is vented to the atmosphere as indicated by the flow path 38b. A portion of the chilled air from the flow path 38a may be communicated to the upper compartment 47. Similarly, chilled air is communicated from the refrigeration module 47a to the middle compartment 42 as indicated by the flow path 42a. Eventually, at least some of this chilled air is vented to the atmosphere as indicated by the flow path 42b and some of the chilled air from the flow path 42a may be directed to the middle compartment 47. The air eventually vented from the compartment 47 is indicated by the flow path 47b and the chilled air supply to the compartment 47 may be a combination of chilled air from one or both of the compartments 38, 42. Suitable baffles may be used in the flow paths 38a, 38b, 42a, 42b, 47b to achieve the desired temperature ranges within the various compartments 38, 42, and 47. The working components disposed in the modules 48, 49, 50 generate heat and therefore insulation is preferably provided along the vertical wall shown generally at 51 and preferably, one or more heat release conduits or chimneys are provided to release heat out the top of the machine 30.

Figure 3:
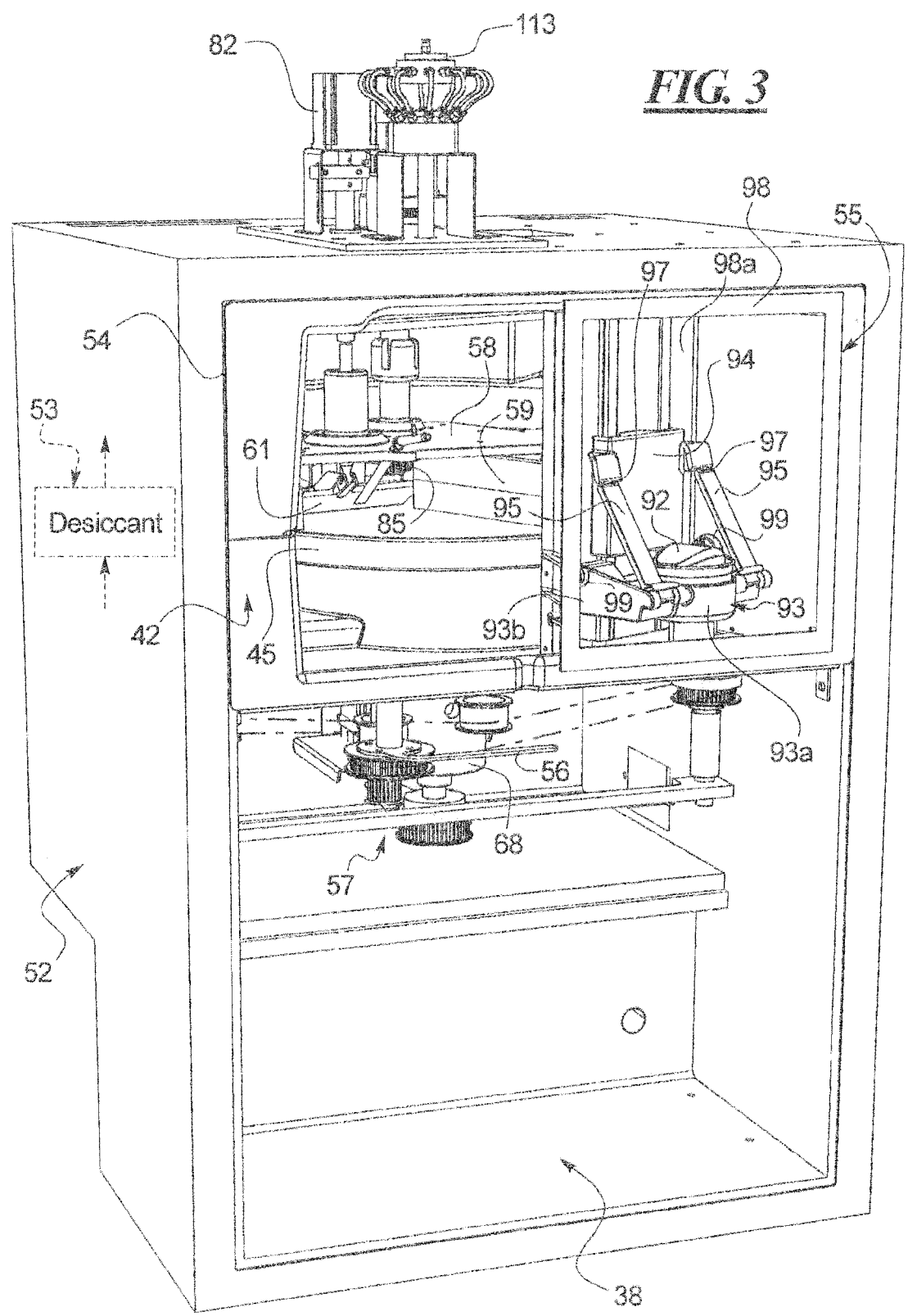
FIG. 3 is a partial perspective view of the machine illustrated in FIGS. 1 and 2, particularly illustrating the insulated compartment where the base materials are stored and chilled and where an ice cream serving is fabricated.

In FIG. 3, a single insulated compartment may be provided for accommodating the base module 38 and the serving fabrication module 42. Preferably, a desiccant canister 53 is provided to control humidity in the serving fabrication module 42. The desiccant canister 53 may be equipped with its own forced air flow fan or a passive system may be employed.

The fabrication module 42 includes a washable liner 54 that covers the upper portion of the compartment 52. At the end of the business day, certain components of the ice cream fabrication module 42 must be removed for cleaning and sanitizing and the liner 54 must also be cleaned or sanitized for compliance with most local health and sanitation laws. In that regard, the cup lifter mechanism 55, whose operation will be explained in greater detail below, is removable. Rotating the lever 56 of the clamp-down mechanism 57 releases the hold-down plate 58, scraper body 59 and spreader body 61, thereby enabling these components to be removed and cleaned. After the cup lifter 55, scraper 59, spreader 61 and hold-down plate 58 are removed, the freeze plate 45 can also be removed for cleaning.

Figure 4:
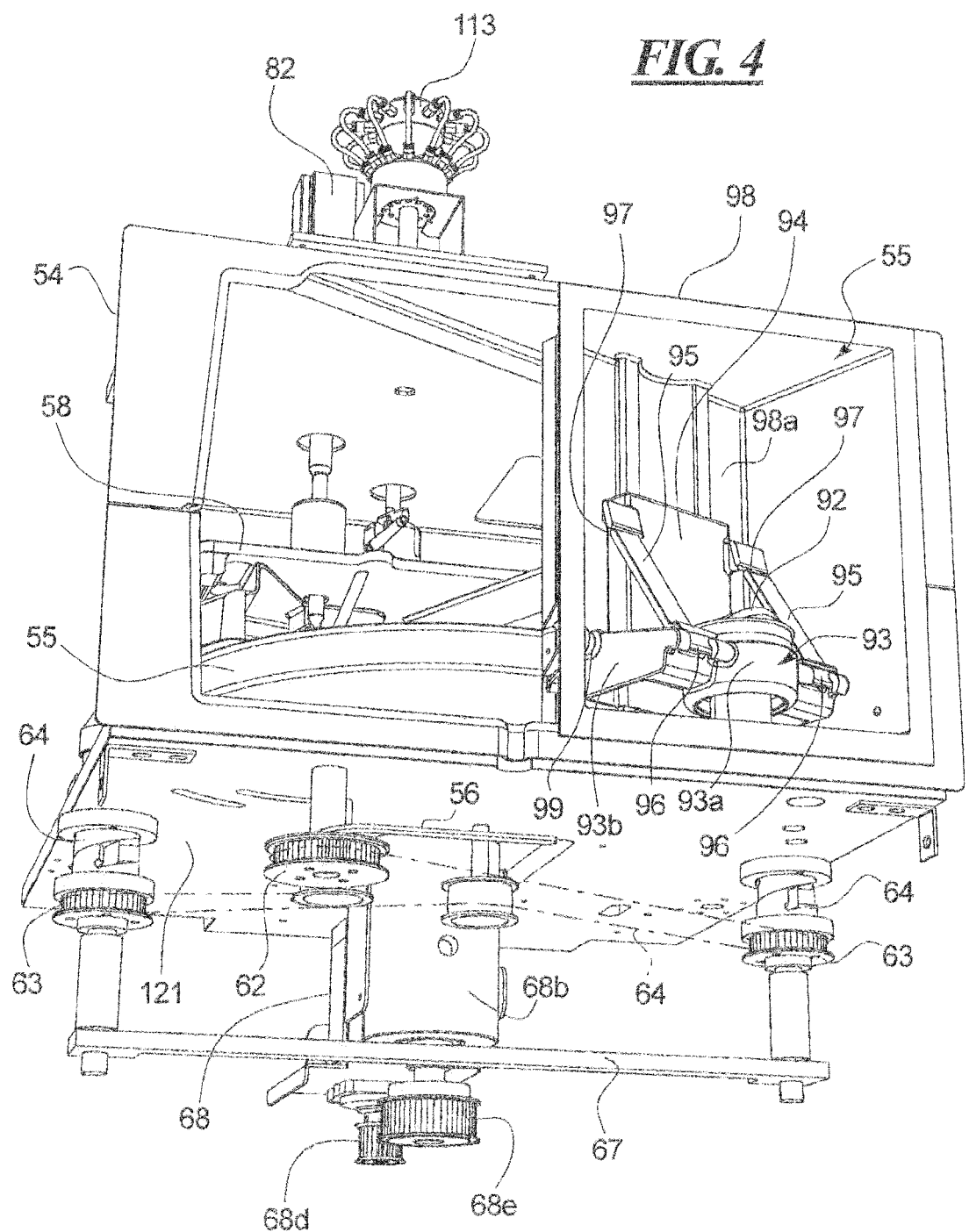
FIG. 4 is a bottom perspective view of the module where an ice cream serving is fabricated, particularly illustrating the clamp-down mechanism that pulls the spreader and scraper elements downward into engagement with the rotating freeze plate.
Figure 5:
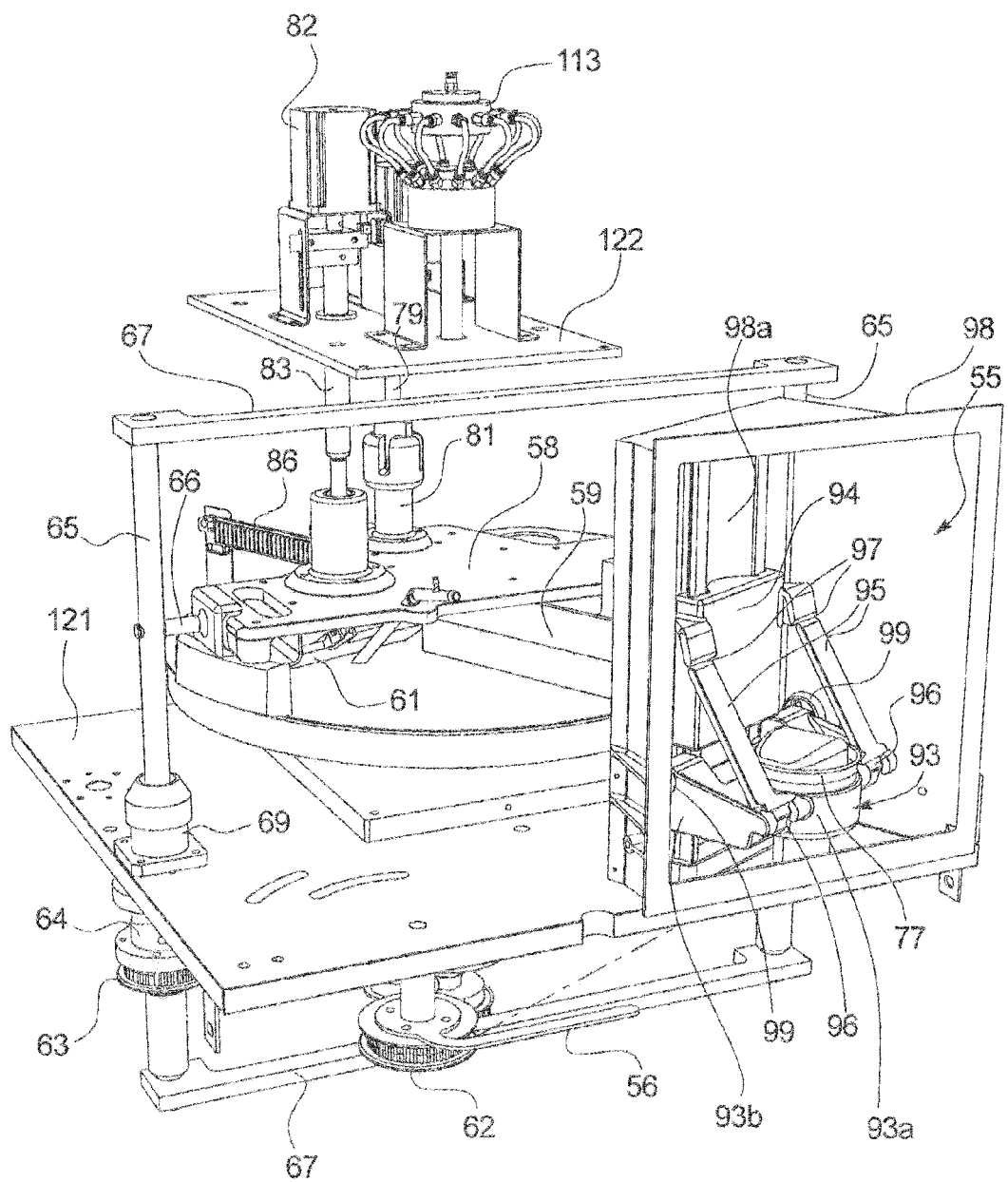
FIG. 5 is another perspective view of the ice cream serving fabrication module particularly illustrating the location where the chilled aerated mix is deposited onto the rotating freeze plate and the location of the cup lifter mechanism.
Figure 20:
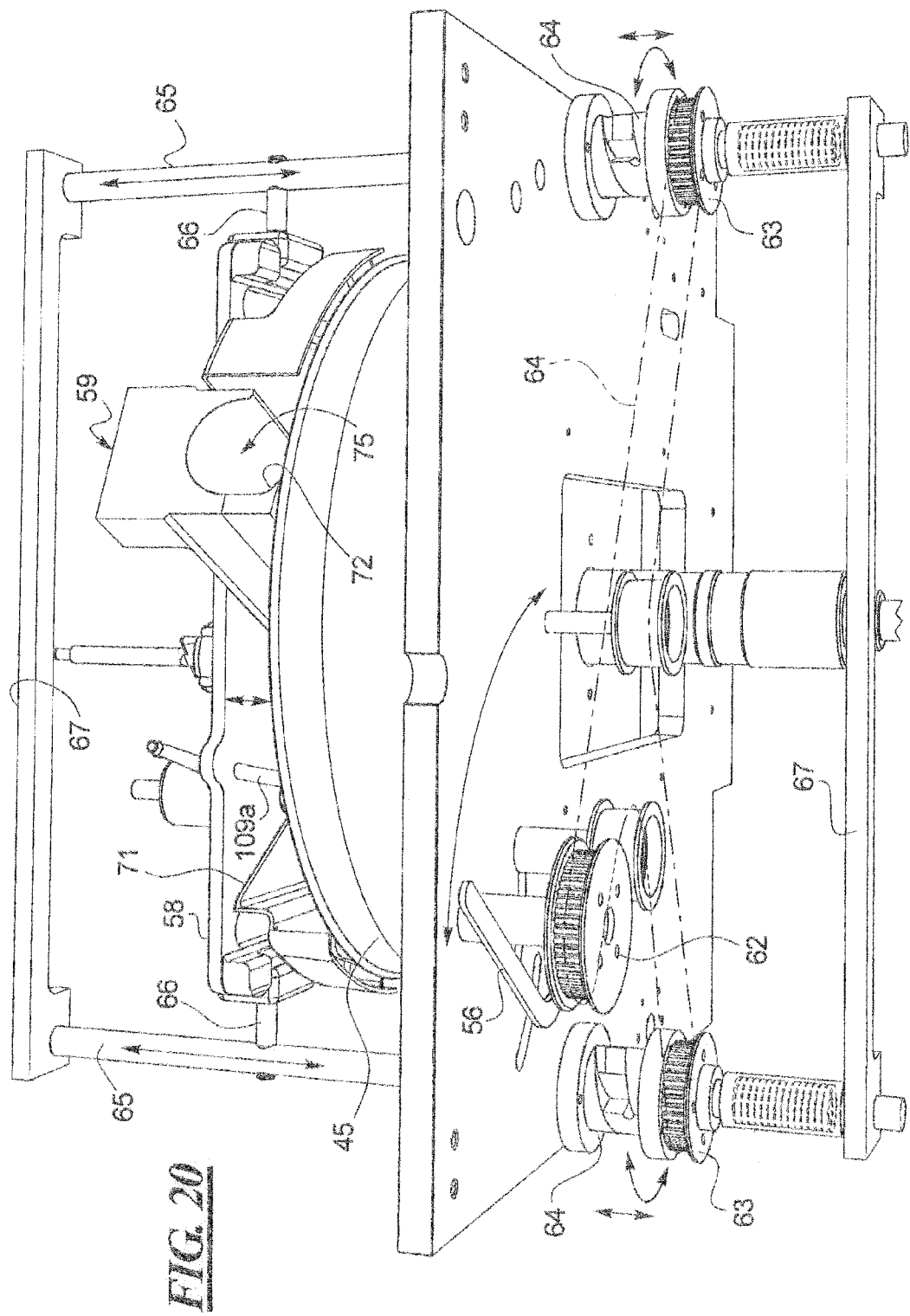
FIG. 20 is a bottom perspective view illustrating the dual vertical cam mechanism that pulls the hold-down plate, spreader body and scraper into position with respect to the rotating freeze plate.

Turning to FIGS. 4-5 and 20, the lever 56 is connected to the pulley 62 which is coupled to the pulleys 63 by a belt shown in phantom at 64. Rotation of the handle 56 results and rotation of the pulleys 62, 63 and the vertical cams 64 thereby causing the vertical posts 65 to be raised or lowered. The posts 65 are coupled to the hold-down plate 58 via the clamps 66. The crossbeam 67 (see also FIG. 20) provides additional structural integrity to the clamp mechanism 64/65/66/58/67. The posts 65, crossbeam 67, clamps 66 and hold-down plate 58 are biased in the upward direction by a pair of springs 69 (see FIGS. 5 and 6). Referring back to FIGS. 3-4, the freeze plate 45 is rotated under the power of the motor shown at 68.

Figure 6:
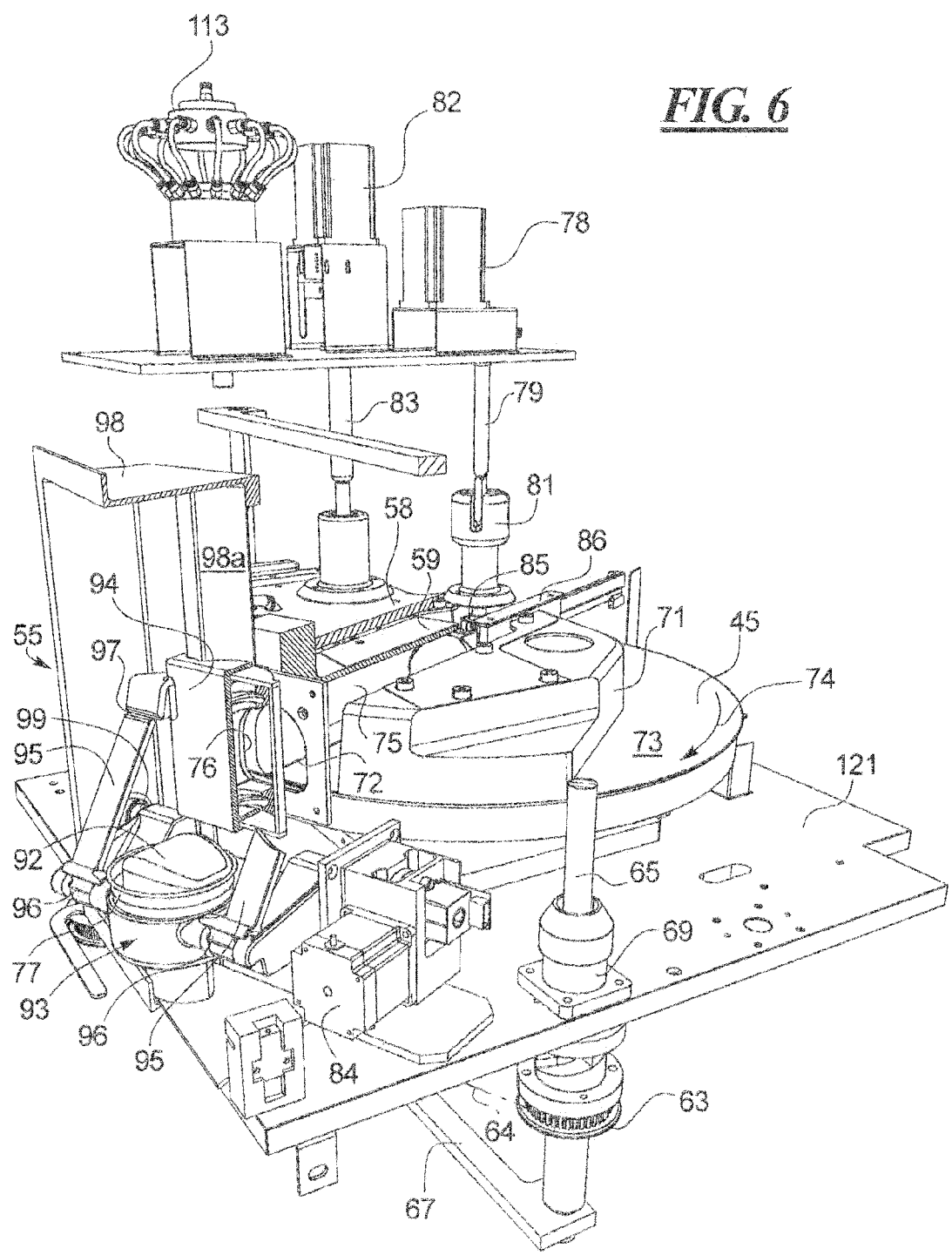
FIG. 6 is a partial perspective view of the ice cream serving fabrication module, particularly illustrating the relationship between the cup lifter mechanism and the scraper body that forms a channel for accumulating scraped frozen aerated mix.
Figure 14A:
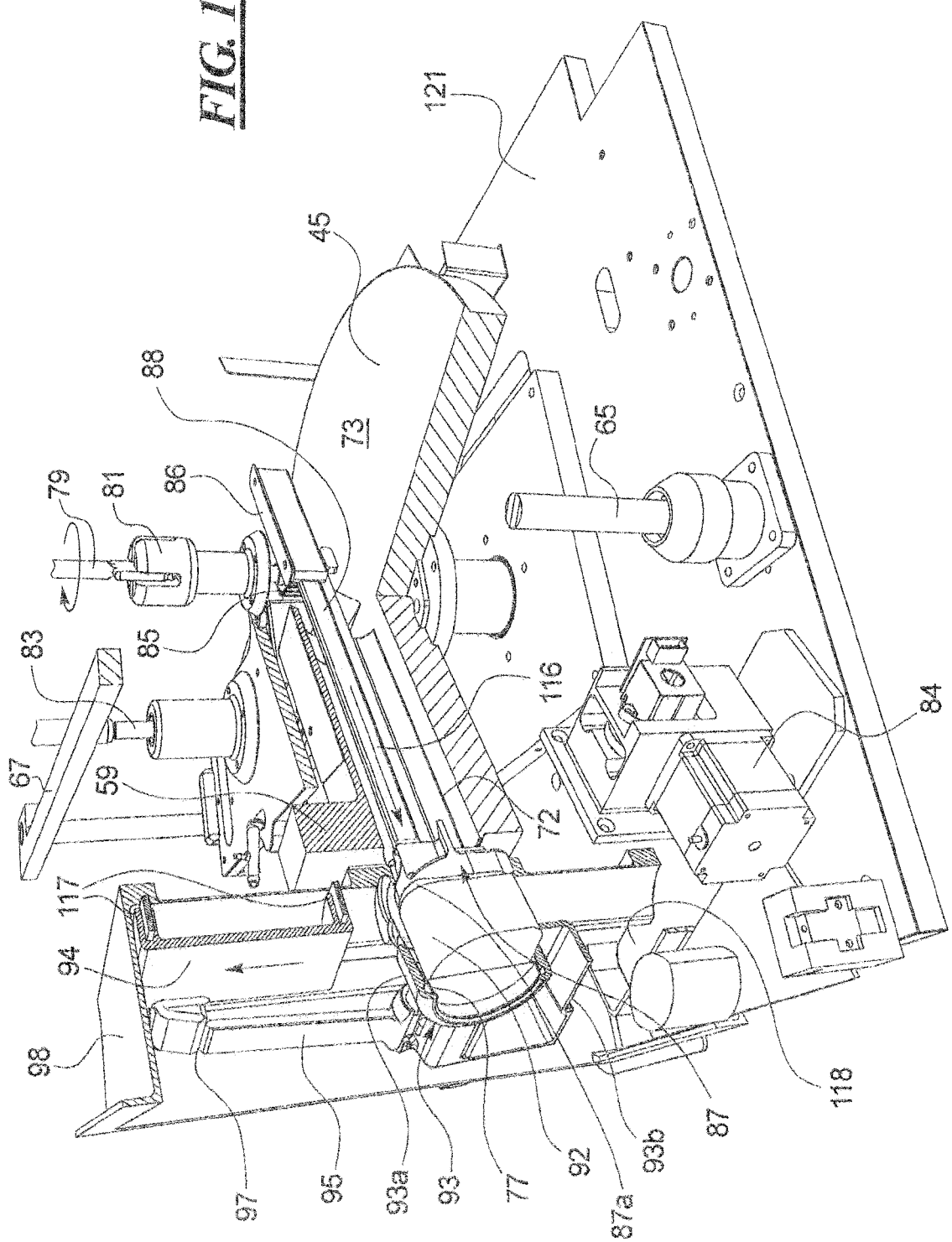
FIG. 14A is another partial perspective and sectional view of the ice cream serving fabrication module illustrating the action of the plow pushing a scraped frozen aerated mix serving down the channel formed in the scraper body and into a serving cup held in a horizontal position by the cup lifter.

Turning to FIG. 6, the freeze plate 45 is partially covered by the hold-down plate 58 and hood 71. The hold-down plate 58 also presses the scraper body 59 downward so that the leading edge or scraper blade 72 engages the upper surface 73 of the freeze plate 45 in a direction opposite the direction of rotation of the freeze plate 45, which is indicated by the arrow 74. FIG. 6 also partially illustrates the channel 75 formed by the scraper body 59 in which scraped, frozen and aerated mix accumulates as the freeze plate 45 rotates. The accumulated scraped frozen aerated mix is collected in the channel 75 and pushed down the channel and through the access opening 76 to an awaiting cup 77 as illustrated in greater detail below in connection with FIGS. 14-17. The plow motor 78 rotates the shaft 79 and plow coupling 81. The plow coupling 81 is connected to a gear 85 (FIGS. 3 and 14) which is enmeshed with a track 86 (FIGS. 5-6 and 14) that is connected to the plow 87 by a shaft 88. Thus, rotational movement of the plow gear 85 is translated into lateral movement of the track 86, shaft 88 and plow 87 (FIG. 14A).

Figure 7A:
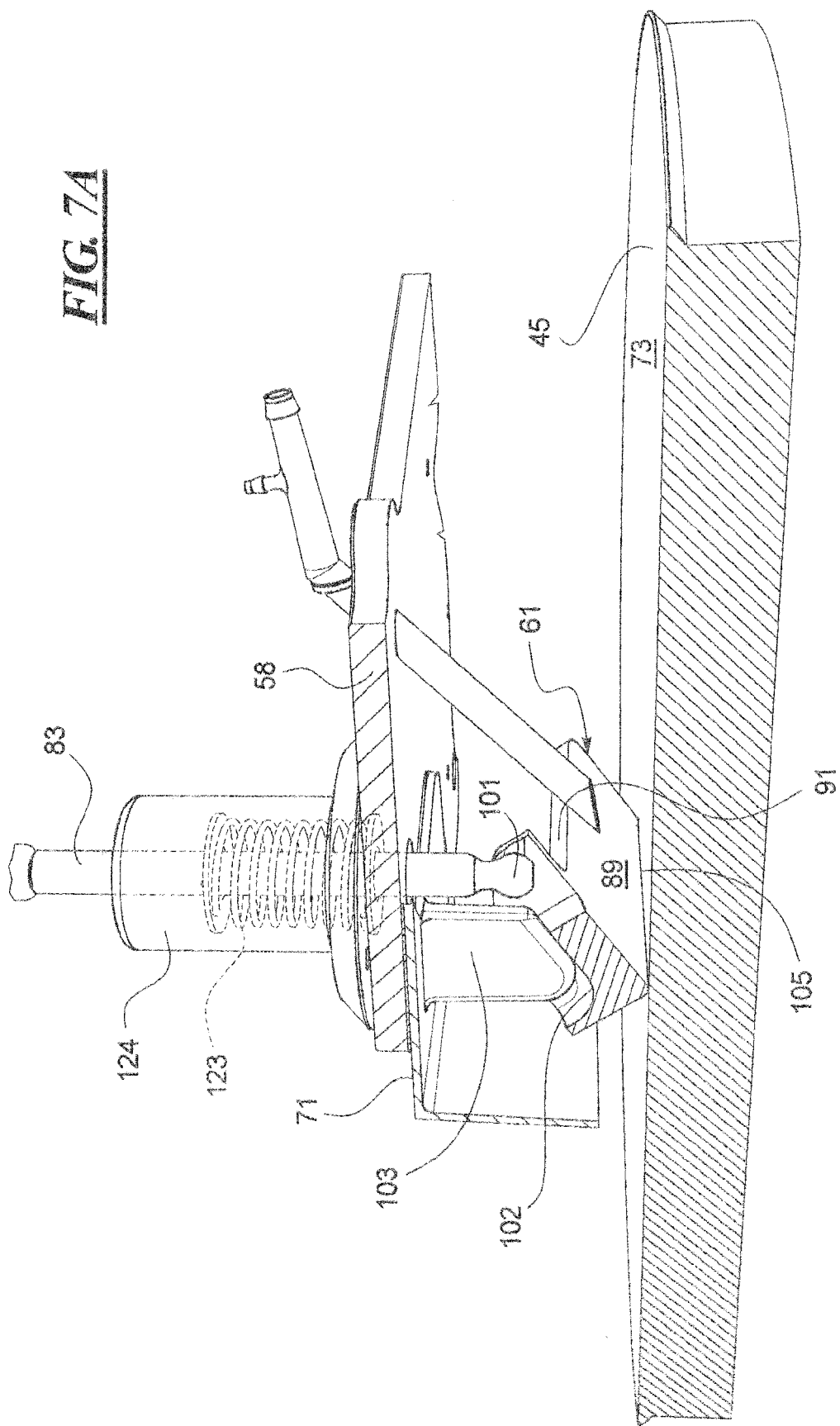
FIG. 7A is a sectional perspective view of the rotating freeze plate, the spreader body, the aerated mix delivery conduit, the hold-down plate and the lift mechanism for moving the spreader body between spreading and cleaning positions.
Figure 19:
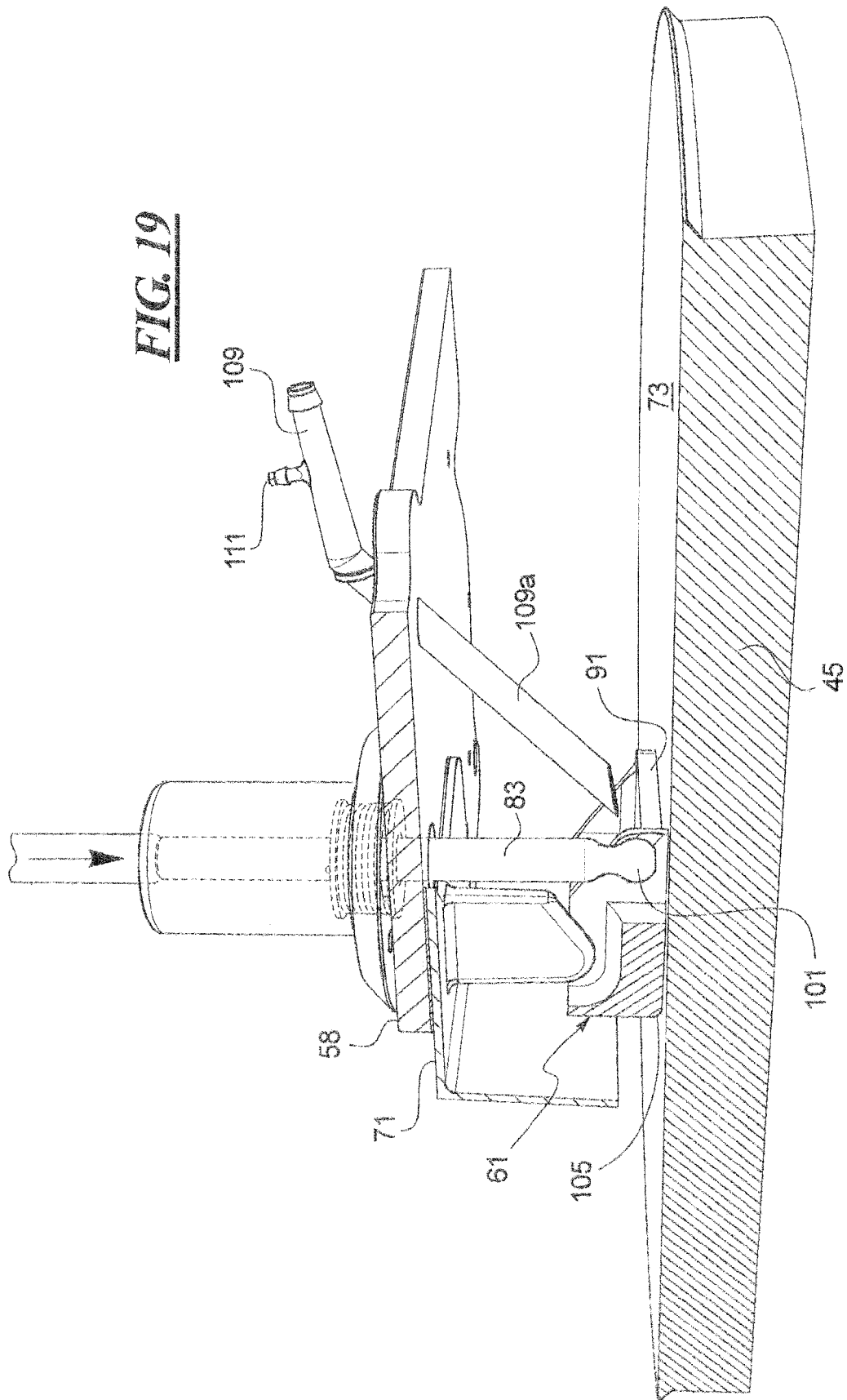
FIG. 19 is a perspective and sectional view of the freeze plate and spreader mechanism, illustrating the spreader mechanism in the cleaning position.

The spreader motor 82 (FIG. 6) raises and lowers the shaft 83 for placing the spreader body 61 in the spreading position shown in FIGS. 7A, 7C and 11 or in the cleaning position shown in FIGS. 18-19. Specifically, downward movement of the shaft 83 (see the arrow 90 of FIG. 18) against the bias of the spring 123 urges of the bottom surface 89 of the spreader body 61 against the upper surface 73 of the freeze plate 75 in a cleaning position. In the position shown in FIG. 18, the forward edge 91 faces the against direction of rotation 74 of the freeze plate 45 in the cleaning position and acts to scrape residue off of the upper surface 73 of the freeze plate 45 to avoid mixing the contents of a previous serving with the serving currently being prepared.

Returning to FIGS. 3-6, 14A, 15A and 16-17, the operation of one embodiment of the cup lifter 55 will be described. The motor 84 (FIG. 6) drives the cup lifter apparatus 55. In the position shown in FIGS. 3-6, the cup lifter 55 is in the dispense or starting position illustrating the position of a realistic looking scoop serving 92 disposed in a cup 77 received in the cup holder 93. The cup holder 93 is pivotally connected to the elevator door 94 so the cup holder 93 can pivot upward and rearward towards the access opening 76 as shown in FIG. 6.

Figure 15A:
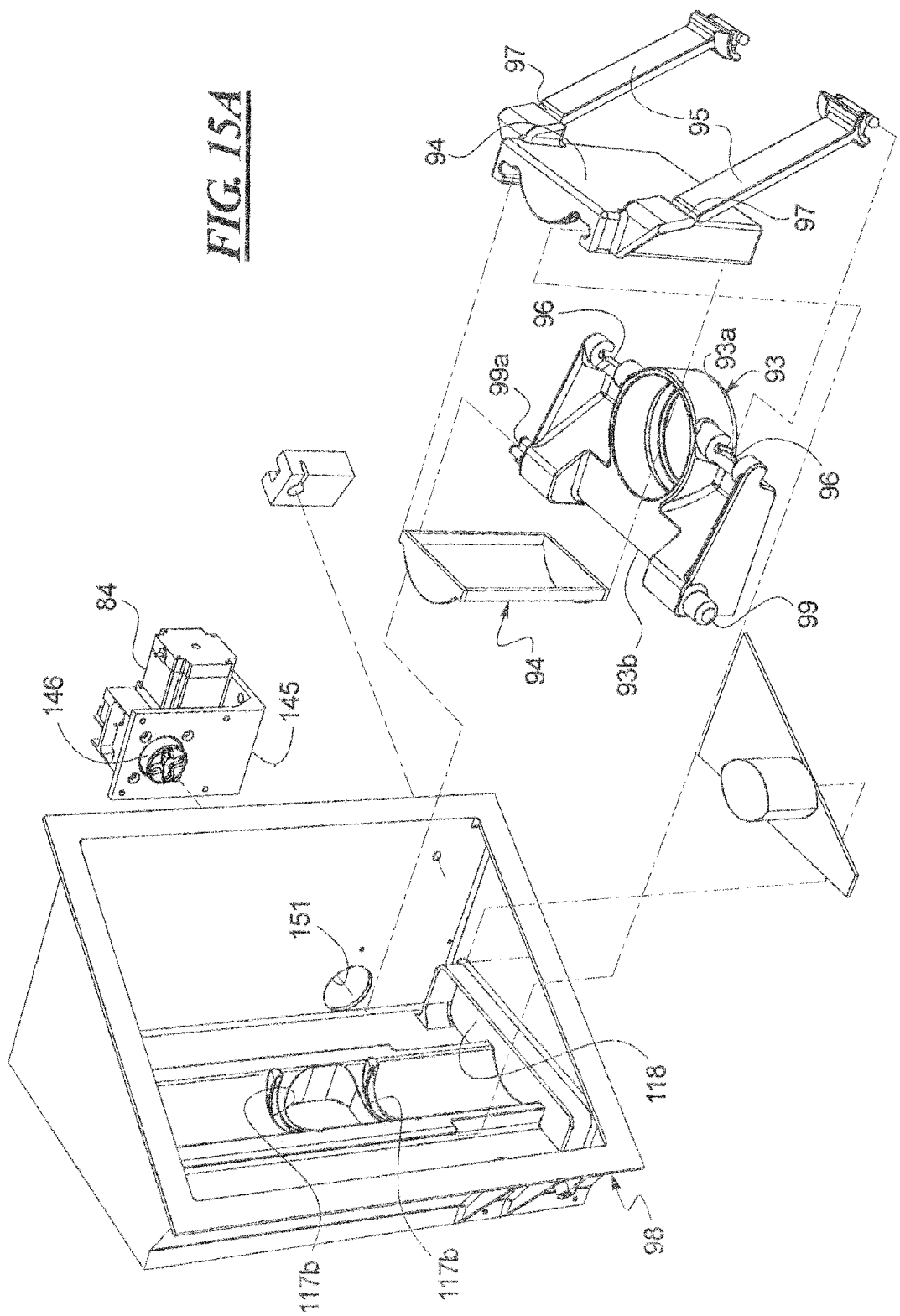
FIG. 15A is an exploded view of the cup lifter mechanism.

More specifically, as shown in FIG. 15A, the cup holder 93 includes a front end 93a pivotally coupled to a pair of spaced apart arms 95 at the pivotal connections shown generally at 96 which couple the proximal ends of the arms 95 to the cup holder 93 using a pivot pin connection. The distal ends of the arms 95 are connected to the door 94 with a living hinge mechanism or other flexible mechanism shown generally at 97. The rear end 93b of the cup holder 93 is pivotally connected to the rear wall 98a frame 98 of the cup lifter 55 at the pivot shafts shown at 99, 99a. As explained below in connection with FIGS. 15A-15B and 17A-17F, the shaped pivot shaft 99a is driven by the cup lifter motor 84. To move the cup 77 and cup holder 93 into a receiving position in front of the access opening 76, the motor 84 rotates the shaft 99a which raises the door 94 upwards towards the top of the frame 98 and causes the cup holder 93 and cup 77 contained therein to pivot towards the access opening 76 and into position in alignment with the channel 75 for receiving the scraped frozen aerated mix that will be pushed into the cup 77 by the plow 87 as illustrated in FIG. 14A.

Figure 9:
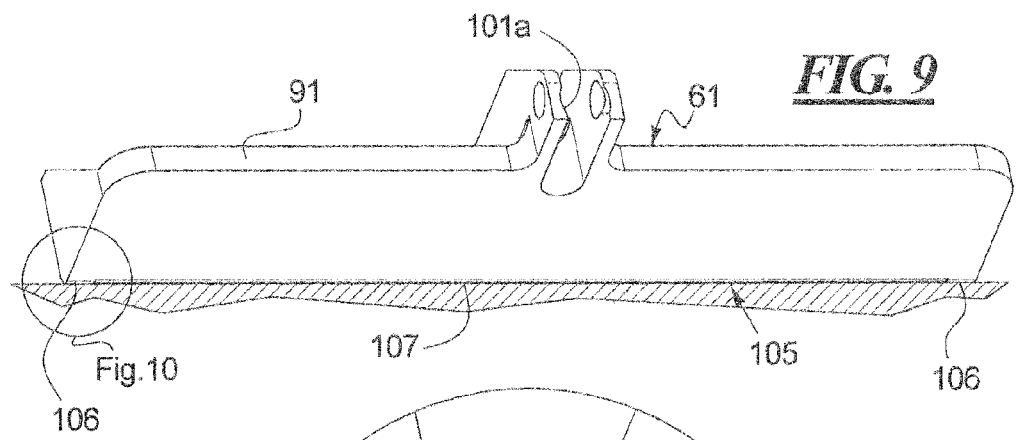
FIG. 9 is a rare perspective view of the spreader body of FIG. 8 as shown engaging the freeze plate and with the spreader body in the spreading position.
Figure 10A:
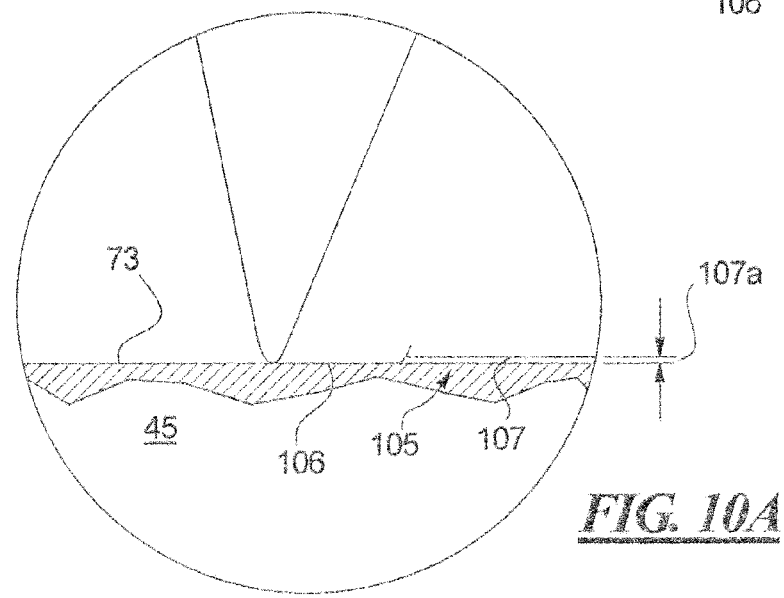
FIG. 10A is an enlarged partial view of the spreader body of FIGS. 8-9 illustrating one of the rounded end supports and a portion of the spreader blade and how the rounded end supports the spreader blade above the upper surface of the rotating freeze plate by a fixed distance or gap thereby ensuring even distribution of the chilled aerated mix on the freeze plate.

Turning to FIG. 7A, the spreader body 61 is pivoted into the spreading position on top of the freeze plate 45 by upward movement of the spreader shaft 83 under the power of the spreader motor 82. Preferably, the spreader shaft 83 is connected to the spreader body 61 by a ball and socket connection as indicated by 101 in FIG. 7A and 101a and FIGS. 8-9. In FIG. 7A, the spreader body 61 has been pivoted upward so that the recess 102 in the spreader body 61 has engaged the abutment 103 disposed on the underside of the hood 71 or hold-down plate 58. In the spreading position illustrated in FIG. 7A, the spreader edge 105 of the spreader body 61 rests against the upper surface 73 of the freeze plate 45. The spreader edge 105 is shown in greater detail in FIGS. 9-10A. Specifically, the spreader edge 105 includes a rounded end supports 106 disposed on either end of a spreader blade 107. The rounded end supports 106 support the spreader blade 107 above the upper surface 73 of the freeze plate 45 by a gap or distance shown at 107a in FIG. 10 to ensure consistent, even spreading of the aerated mix over the upper surface 73 of the freeze plate 45. The spreader blade 107 and end supports 106 also define an area of the upper surface 73 over which the aerated mix is spread.

Figure 10B:
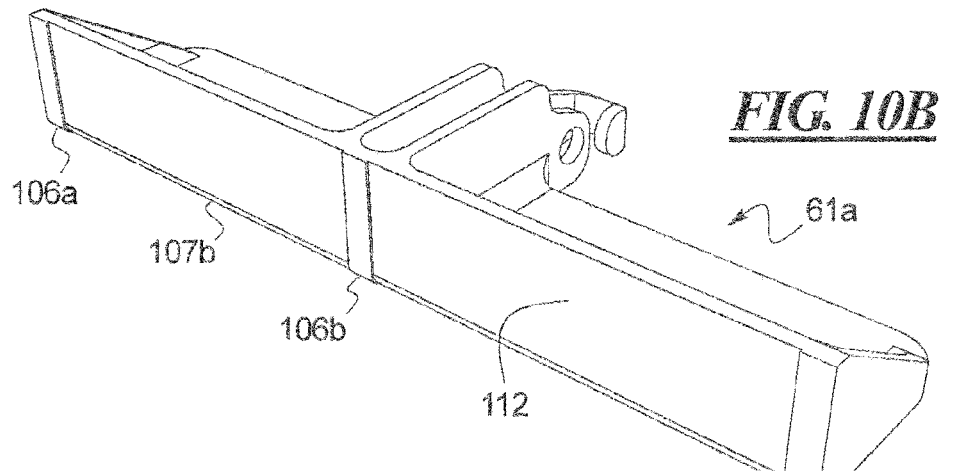
FIG. 10B is a front perspective view of another disclosed spreader body which features a middle support or foot in addition to the two rounded end supports.
Figure 10C:
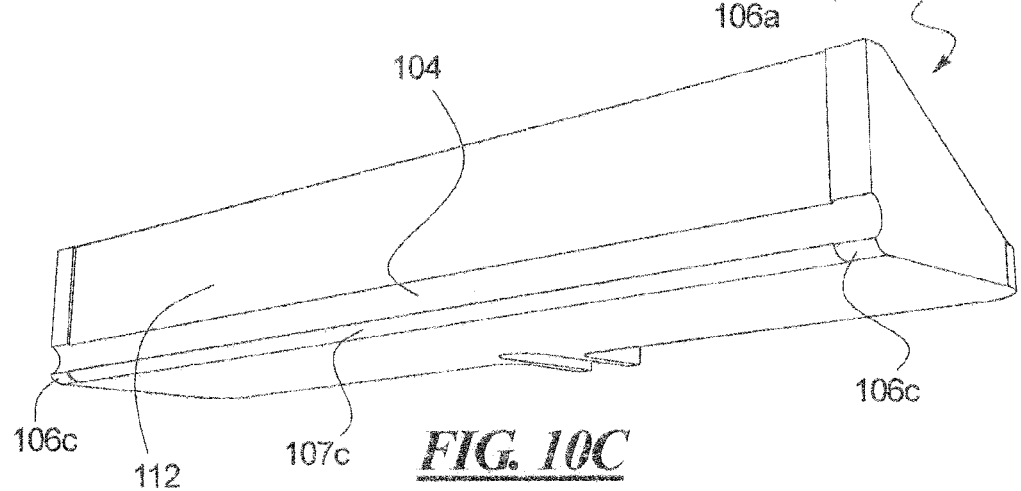
FIG. 10C is a rare perspective view of yet another disclosed spreader body with a recess extending along the rear edge of the spreader body for avoiding the accumulation of waste material.
Figure 10D:
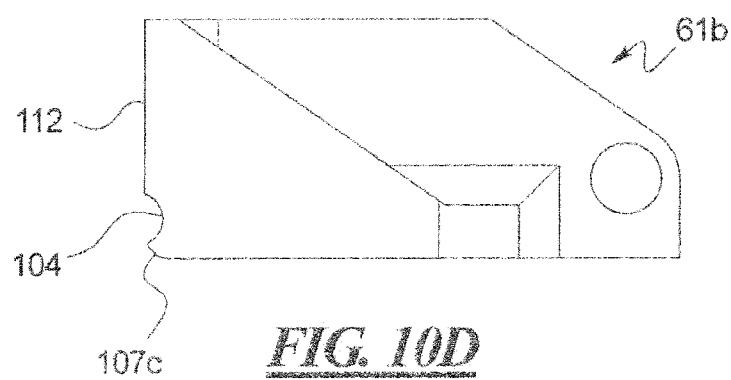
FIG. 10D is a partial in view of the spreader body shown in FIG. 10C.

Alternative the spreader bodies 61a, 61b are illustrated in FIGS. 10B-10D. In FIG. 10B the spreader blade 107b includes three supports including to end supports 106a and a middle support 106b. It has been found through testing that maintenance of a consistent gap 107a between the upper surface 73 of the freeze plate 45 (FIG. 10A) is imperative for obtaining a high quality product. That is, once the rotational speed of the freeze plate 45 is determined, which is dependent upon the height of the gap 107a, maintenance of the gap is paramount for quality product. Otherwise, the rotational speed of the freeze plate 45 must be adjusted. Because force is applied to the spreader body 61, any downward bowing of the spreader blade 107, 107b will affect the height of the gap 107a. In one embodiment, the gap 107a is maintained at about 12 mil (304.8 μm). The employment of a center foot 106b helps to maintain a consistent gap of 12 mil (304.8 μm).

Another problem associated with the spreader bodies 61, 61a is addressed in the embodiment 61b illustrated in FIGS. 10C-10D. Specifically, build up of waste material tends to occur on the rear wall 112 of the spreader bodies 61, 61a, 61b during the cleaning cycle. Through testing, it has been found that the inclusion of a recess 104 in the rear wall 112 close to the spreader blade 107c helps to alleviate this problem.

FIGS. 7B and 7C further illustrate the means for moving the freeze plate 45, spreader body 61 and plow 87. Turning to FIG. 7B, the freeze plate 45 is connected to the stepper motor 68 by the coupling assembly 68a, 68b and spur gears 68c, 68d. As suggested in FIG. 4, a pair of pulleys 68d, 68e may also be employed instead of the spur gears 68c, 68d. The coupling assembly 68a, 68b, stepper motor 68 and freeze plate 45 are all supported by the platform 121. In FIG. 7C, the stepper motor 82 that is used for raising and lowering the forward cleaning edge 91 of the spreader body 61 and the stepper motor 78 that is used for moving the plow 87 are supported on the upper platform 122. The spreader body 61 is shown in the retracted or spreading position in FIGS. 7A and 7C, meaning that the motor 82 has raised the shaft 83 upward against the bias of the spring 123 thereby lifting the forward end 91 of the spreader body 61 away from upper surface 73 of the freeze plate 45 while leaving the spreader edge 105 in the abutting relationship with the upper surface 73 of the freeze plate 45 as shown in FIGS. 7A and 7C. The spring 123 for biasing the spreader shaft 83 downward may be accommodated in a standard housing 124. The shaft 83 may be equipped with a flag 125 which can be sensed by an optical or magnetic sensor 126 when the shaft 83 and spreader 61 are in the upward or spreading position illustrated in FIGS. 7A and 7C.

Figure 7D:
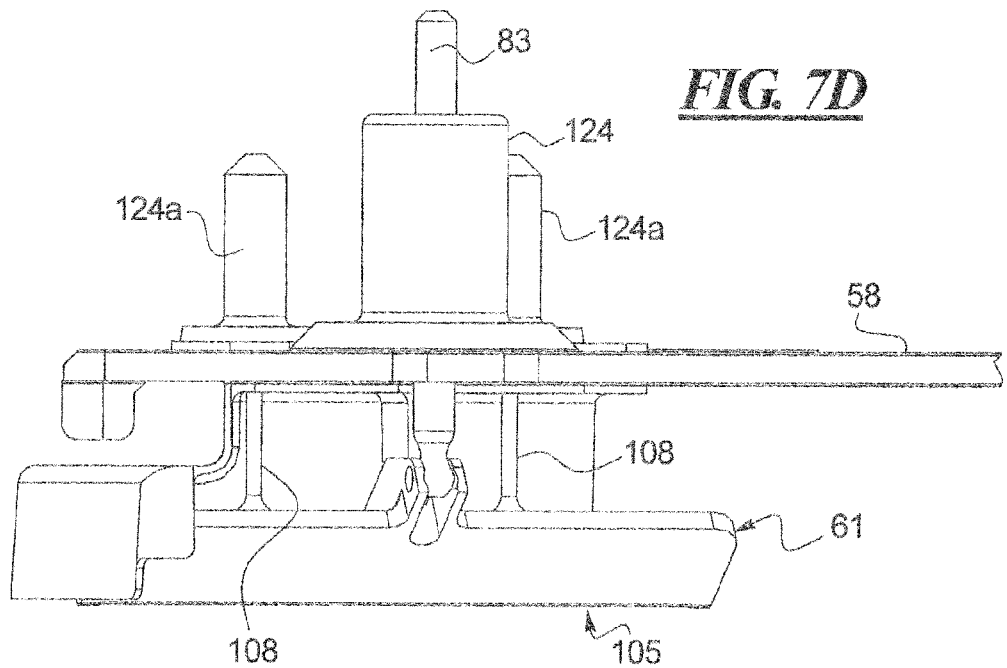
FIG. 7D is a side view illustrating an alternative arrangement for the spreader assembly which includes a pair of springs for biasing the rear end of the spreader body against the freeze plate.
Figure 7E:
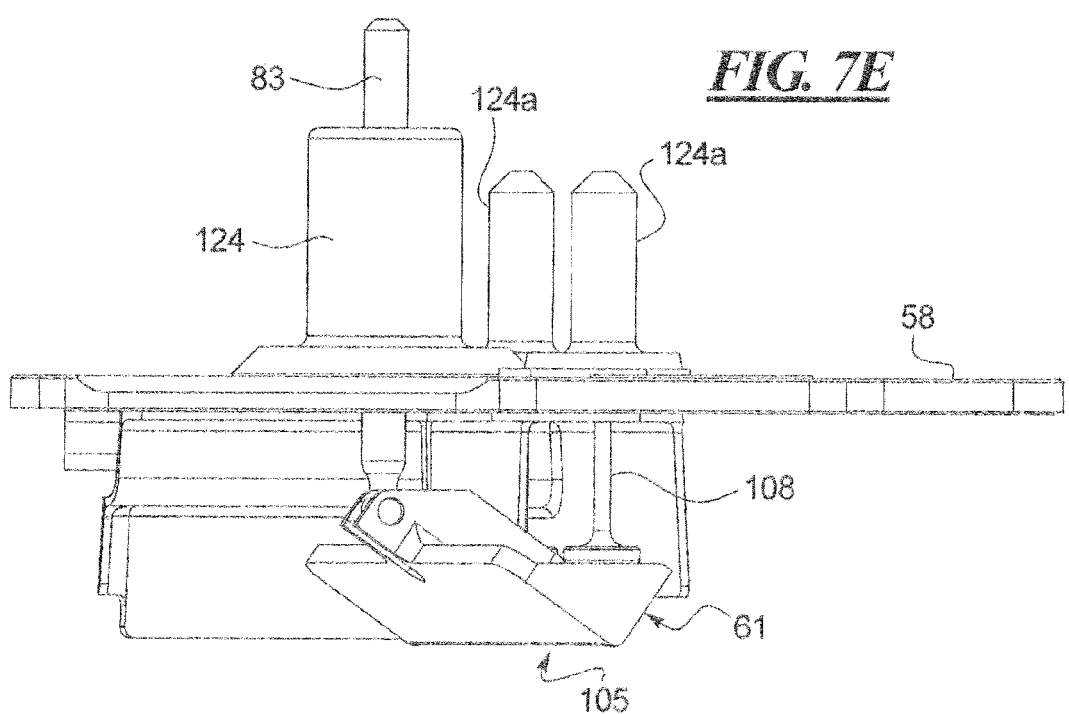
FIG. 7E is another side view of the spreader assembly shown in FIG. 7D.
Figure 8:
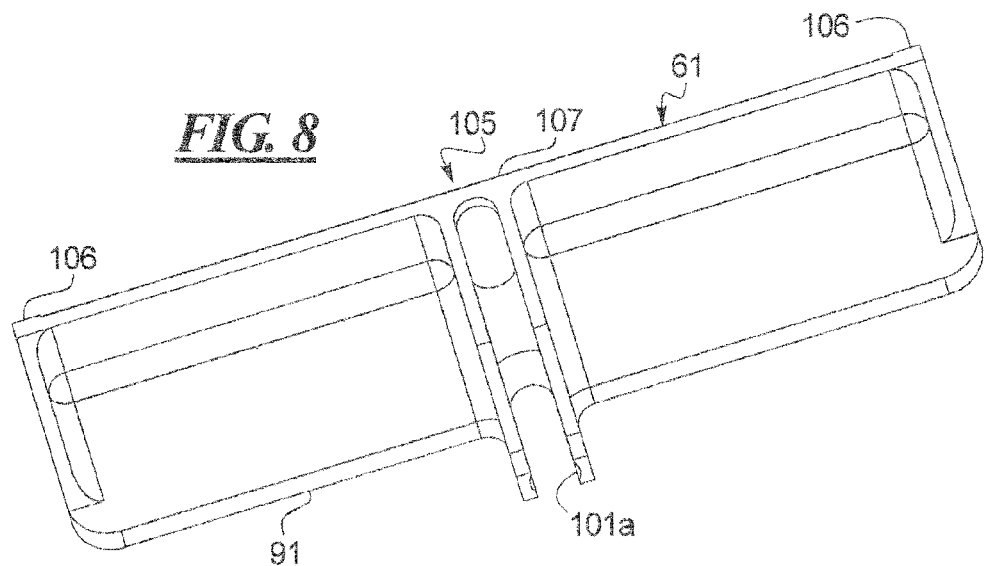
FIG. 8 is a top plan view of one disclosed spreader body.

Turning to FIGS. 7D and 7E, an alternative arrangement for biasing the spreader edge 105 of the spreader body 61 onto the freeze plate 45 (not shown in FIGS. 7D and 7E) is illustrated. Instead of the abutment 103/recess 102 combination illustrated in FIG. 7A, the spreader body 61 is biased downward by a pair of spring-biased feet 108 which include a spring (not shown) disposed within the housings 124a. The pair of spring-biased feet 108 apply uniform downward pressure on the spreader body 61 to help maintain a consistent gap 107a between the spreader body 61 or spreader blade 107 and the freeze plate 45 (see FIG. 10A). Yet another means for applying downward pressure on the spreader body 61 is illustrated in FIG. 7F in the form of a flexible biasing member 108a which may be connected to the hold down plate 58 and which may be constructed from a relatively rigid but flexible material, such as rubber. Other materials will be known to those skilled in the art. Still another means for biasing the spreader edge 105 of the spreader body 61 towards the freeze plate 45 is illustrated and FIG. 7G. Each end of the spreader body 61 accommodates a magnet 108b and the hold down plate 58 is similarly equipped with a pair of magnets 108c of opposite polarity to the magnets 108b. The use of magnets 108b, 108c of opposing polarities is ideal as it includes no moving parts or parts prone to wear.

Figure 11A:
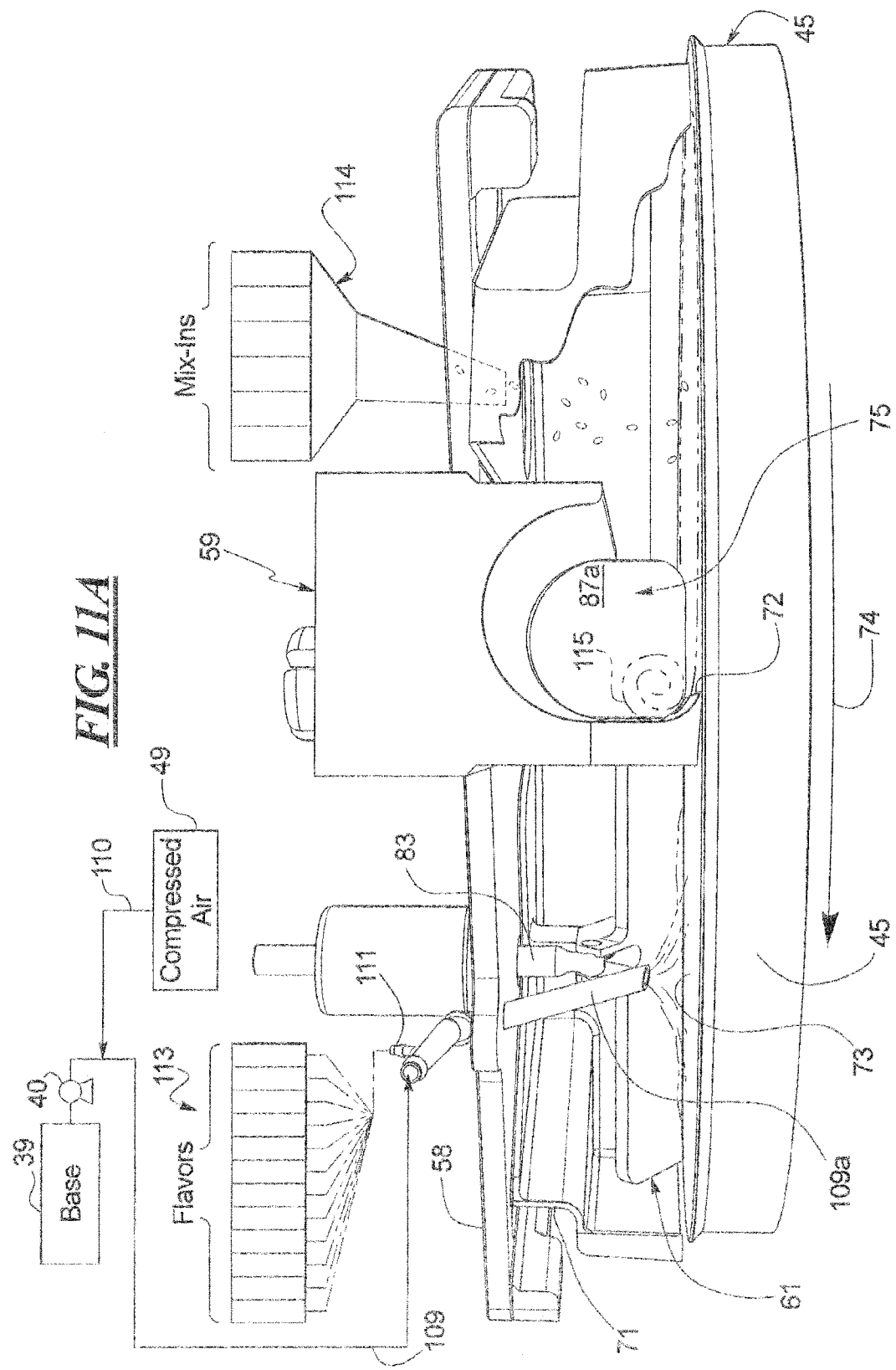
FIG. 11A is a side plan view of the freeze plate, scraper, spreader, hold-down plate along with the schematic illustrations of the base, flavor, air and mix-in supplies.

Turning to FIG. 11A, the fabrication of a serving 92 will be described. Chilled base from a base container 39 is delivered to a conduit 109 by a pump 40 (FIG. 2) where it is aerated with a flow of air delivered through an air inlet 110 and provided by the compressor 46 (FIGS. 2A, 2B). The aerated chilled base continues to flow through the conduit 109 and is combined with one or more flavors delivered to a flavor inlet 111 by flavor pumps (not shown) and manifold 113 (see also FIGS. 3-6) to create a "mix" passing through the inlet conduit 109a before it is deposited onto the upper surface 73 of the rotating freeze plate 45 as shown in FIG. 11A. The flavor pumps may be a plurality of peristaltic pumps, each with its own stepper motor. The slots 115, 115a shown in FIG. 2A can be used to accommodate flavor containers, peristaltic pumps and stepper motors for running the flavor pumps.

As the plate 45 rotates in the direction of the arrow 74, the mix deposited on the upper surface 73 and passes underneath the spreader 61 to provide a smooth even layer on the surface 73 of the plate 45 where the aerated mix freezes. As the plate 45 continues to rotate, the frozen aerated mix rotates towards the scraper 59 and, more specifically, the scraper blade 72. Prior to being engaged or scraped by the scraper blade 72, additional solid material ("mix-ins") may be deposited through a hopper system 114 and onto the frozen layer of aerated mix illustrated towards the right in FIG. 11A. As the plate 45 continues to rotate, frozen aerated mix is scraped off of the upper surface 73 by the blade 72 to form a growing cylindrical mass 115 or "pre-scoop" inside the channel 75. After the plate 45 has made a complete rotation, the base pump 40 and flavor pump/module 113 are turned off and the shaft 83 is lowered to place the spreader body 61 into the cleaning position as shown in FIGS. 18-19 and described above. The accumulated mass 115 in the channel 75 is ready to be pressed into a scoop 92 and deposited in a serving container 77.

Figure 11B:
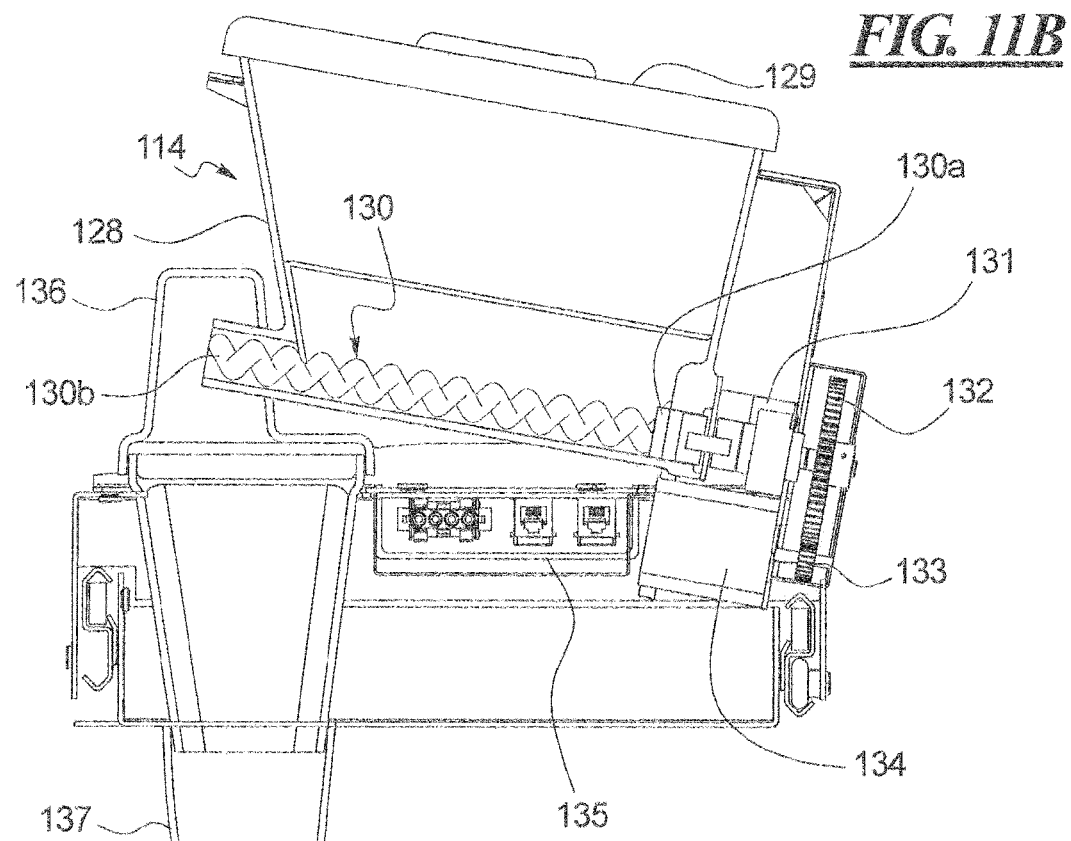
FIG. 11B is a side plan view of a mix-in dispenser assembly particularly illustrating the bin, auger, stepper motor, funnel and chute.
Figure 11C:
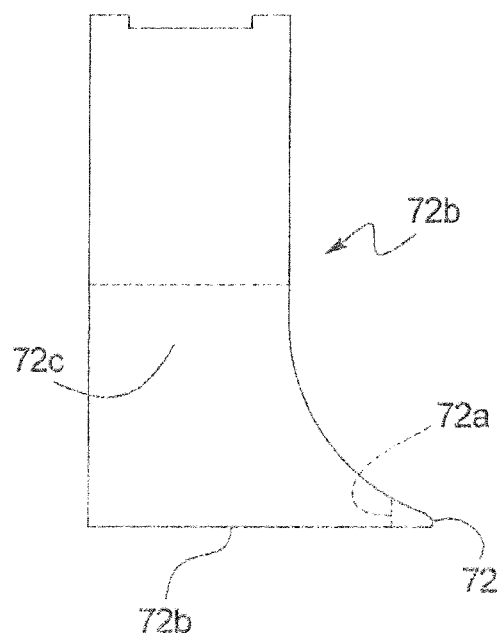
FIG. 11C is a side plan view of the scraper body particularly illustrating the option of the truncated leading edge and a replaceable bottom portion that may be fabricated from a wearable material, such as polyurethane.

As illustrated in FIG. 11C, the scraper blade 72a may be truncated. The truncated version of the scraper blade 72a has been found to leave less residue on the freeze plate 45 which avoids problems associated with carryover of ice cream of one serving (e.g. pistachio-green) bleeding into or leaving traces on a subsequent serving of ice cream of another color (e.g. vanilla-yellow). Further, the scraper body 72b may also include a replaceable lower portion 72c is fabricated from wearable material, such as polyurethane. It is important that the bottom 72d and blade 72, 72a of the scraper 72b maintain intimate contact with the freeze plate 45 to facilitate the subsequent cleaning that is carried out via the spreader blade 61. Keeping the upper surface 73 freeze plate 45 clean avoids colored ice cream of one serving from contaminating or leaving streaks on the colored ice cream of a subsequent serving. Employing a replaceable lower portion 72c of the scraper 72b helps to ensure that substantially all of the material is scraped off of the upper surface 73 of the freeze plate 45 prior to being dispensed by the plow 75.

Figure 13:
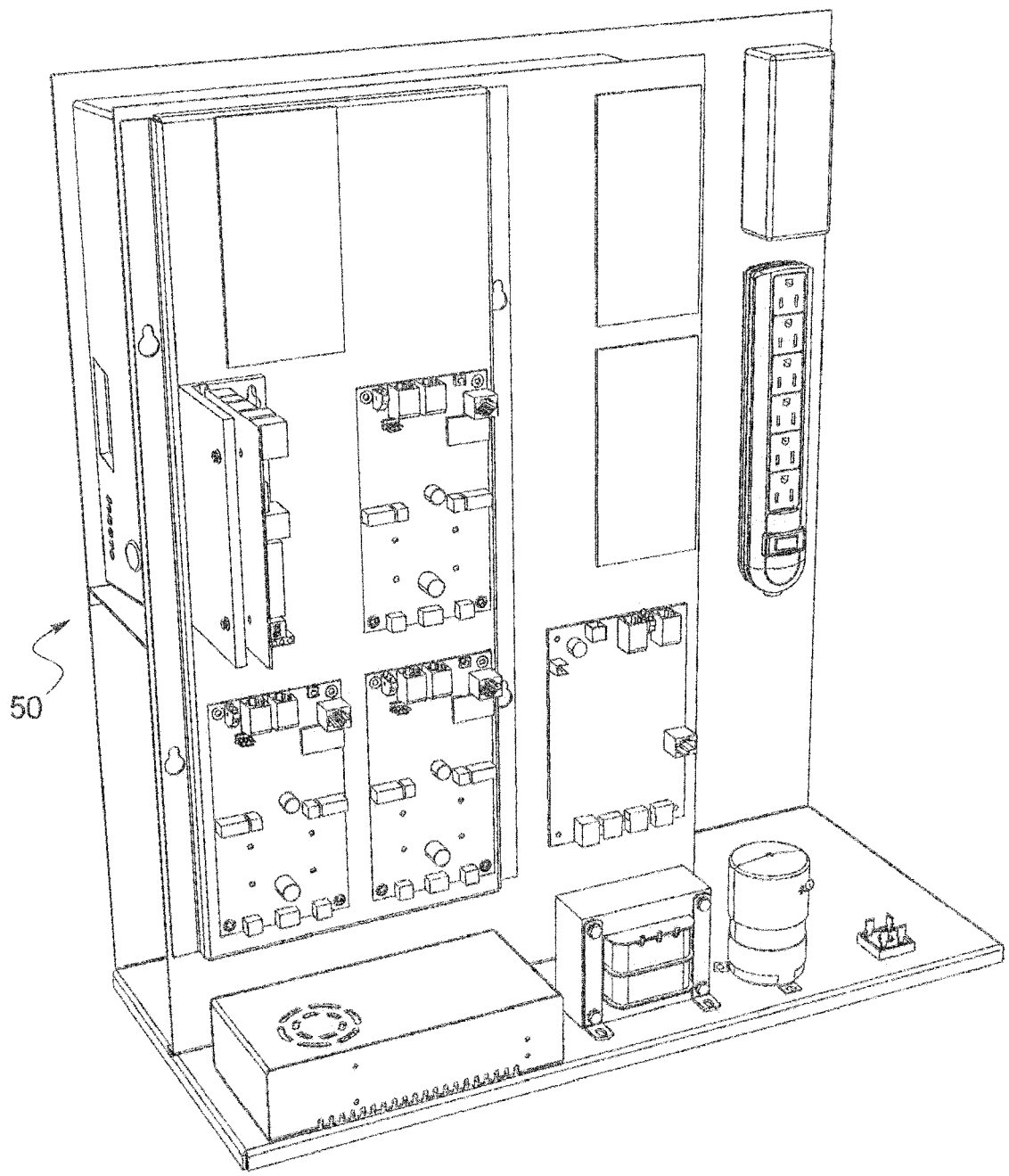
FIG. 13 is a perspective view of the electronic controls for a disclosed dispensing machine.

Additional details of the hopper system 114 are provided in FIG. 11B. The hopper system 114 preferably includes a bin 128 that is equipped with a cover 129. The bin 128 accommodates an auger 130. The proximal end 130a of the auger 130 is connected to a coupling 131 that, in turn, is connected to a spur gear 132. The spur gear 132 is enmeshed with a spur gear 133 that is connected to the auger stepper motor 134. The controller 135 relays the communications from the control module 50 (FIG. 13). The distal end 130b of the auger 130 extends into a funnel 136. The funnel 136 is disposed above and preferably is connected to a chute 137, through which the particulate mix-in materials pass before being deposited onto the aerated base layer that has been deposited onto the upper surface 73 of the rotating freeze plate 45.

Figure 14B:
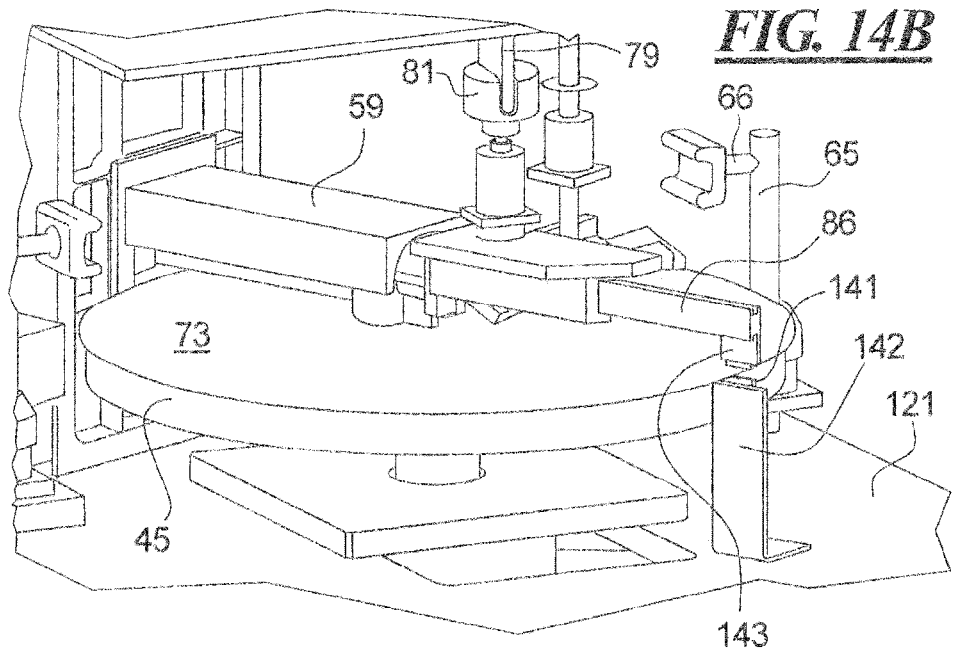
FIG. 14B is a partial perspective view illustrating the plow in a fully retracted position is indicated by the position of the magnet over the magnet sensor.
Figure 14C:
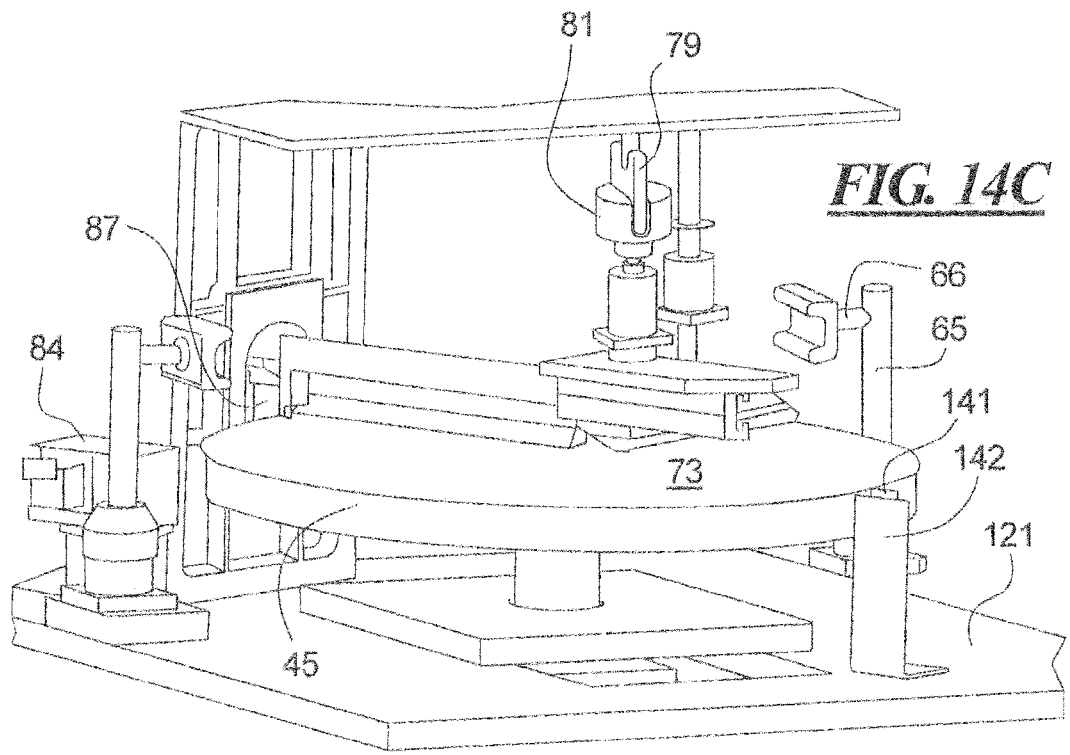
FIG. 14C is another partial perspective view illustrating the plow in a fully extended or cleaning position.

Turning to FIGS. 14A-18 and first to FIGS. 14A-14C, the plow motor 78 (FIG. 18) is activated thereby rotating the shaft 79 and plow coupling 81 which causes the gear 85 (FIG. 14A) to rotate and move the rack 86 forward or in the direction of the arrow 116 to the fully extended position shown in FIG. 14A. The plow 87 pushes the mass 115 into the cup 77 thereby forming a scoop-shaped mass 92. As shown in FIGS. 14B-14C, a sensor 141, such as an optical or magnetic sensor, is supported above the platform 121 by a bracket 142. When the rack 86 and plow 87 have been moved to the retracted or home position shown in FIG. 14B, the flag 143, which can be a magnet or other suitable device for use with the sensor 141, is disposed above the sensor 141 for purposes of generating a signal to stop the action of the plow motor 78. In the position shown in FIG. 14C, the plow 87 is in a position to be cleaned by the wiper elements 117 shown in FIGS. 14A and 17A.

Specifically, the wiper elements 117 built into or connected to the door 94. After the cup 77 is filled with a scoop 92, and the cup holder 93 is ready to be pivoted downward so the cup 77 can be retrieved by the consumer, the plow 87 is retracted only slightly from the position shown in FIG. 14A to the position shown in FIG. 14C so that when the door 94 is lowered under the action of the motor 84, the wiper elements 117 (FIGS. 14A and 17A) will clean the front surface of the plow 87 and deposit the scrap material in the waste channel 118 of the frame 98 of the cup lifter 55 (see FIGS. 15A, 16 and 17).

Turning to FIG. 15B, the cup lifter motor 84 is connected to a coupling assembly 145. A drive coupling is shown at 146 in FIG. 15A. The drive coupling 146 is driven by the shaft 147 shown in FIG. 15B. The shaft 147 is connected to an encoder wheel 148, the position of which can be sensed by a sensor 149. The drive coupling 146 passes through the opening 151 in the cup holder frame 98 before engaging the shaped pivot shaft 99a as shown in FIG. 15A. Rotation of the shaft 99a under the force of the motor 84 results in the pivotal movement of the cup holder 93 and the door 94 as the cup holder 93 and door 94 connected by the arms 95.

Figure 15E:
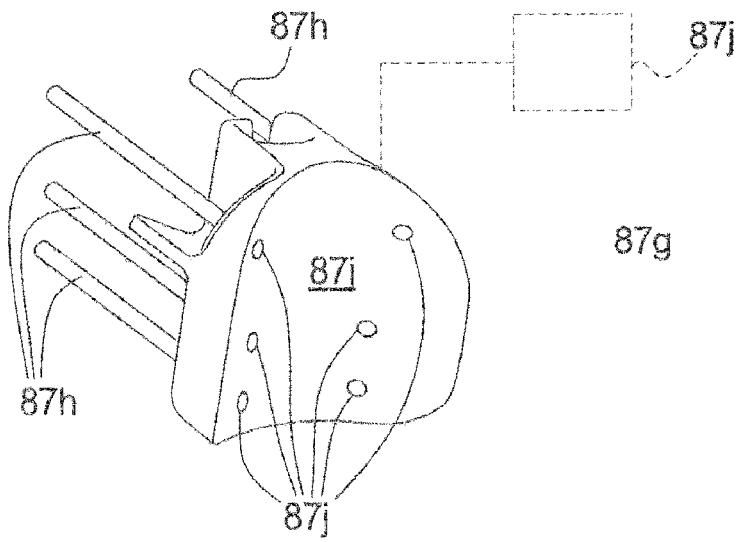
FIG. 15E is a perspective view of yet another plow element with a hard face that comprises a plurality of air outlet ports, each of which are connected to a pressurized air supply for releasing the ice cream portion from the plow face.
Figure 15F:
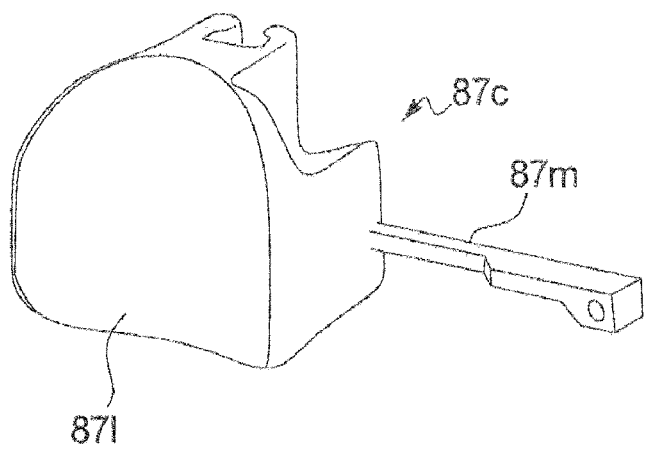
FIG. 15F is a perspective view of the plow element equipped with a plunger for releasing the ice cream portion from the plow face.
Figure 15G:
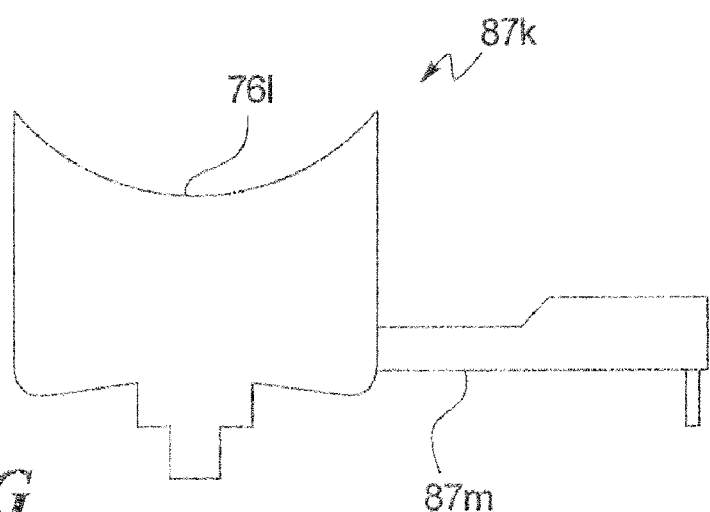
FIG. 15G is a top plan view of the plow element shown in FIG. 15F.

FIGS. 15C-15G address problems associated with the prepared a serving or scoop 92 sticking to the face 87a of the plow 87. In FIG. 15C, a modified plow 87b is illustrated with a soft, elastomeric face 87c. The soft, elastomeric face 87c is preferably fabricated from a material that does not stick to ice cream, such as polytetrafluoroethylene (PTFE or Teflon®). Other materials will be apparent to those skilled in the art. In FIG. 15D, another plow 87d is illustrated with a soft, elastomeric face 87e that serves as a bladder. Air conduits are shown at 87f for inflating and deflating the elastomeric bladder 87e. In FIG. 15E, the plow 87g includes a hard face 87h with a plurality of air ports 87i connected to a plurality of air conduits 87h. When a scoop or serving 92 is being dispensed, air is delivered through the conduits 87f and out the air ports 87i to release a scoop 92 from the face 87h. As an alternative, a plow face 87h, with or without air ports 87i, can be equipped with a heater 87j for maintaining the face 87h at a temperature above the melting point of the ice cream to enhance release of a scoop 92 from the face 87h. FIGS. 15F-15G illustrate yet another plow 87k equipped with a plunger 87l that can be pushed outward by the leg 87m to release a scoop 92 of ice cream.

Figure 17C:
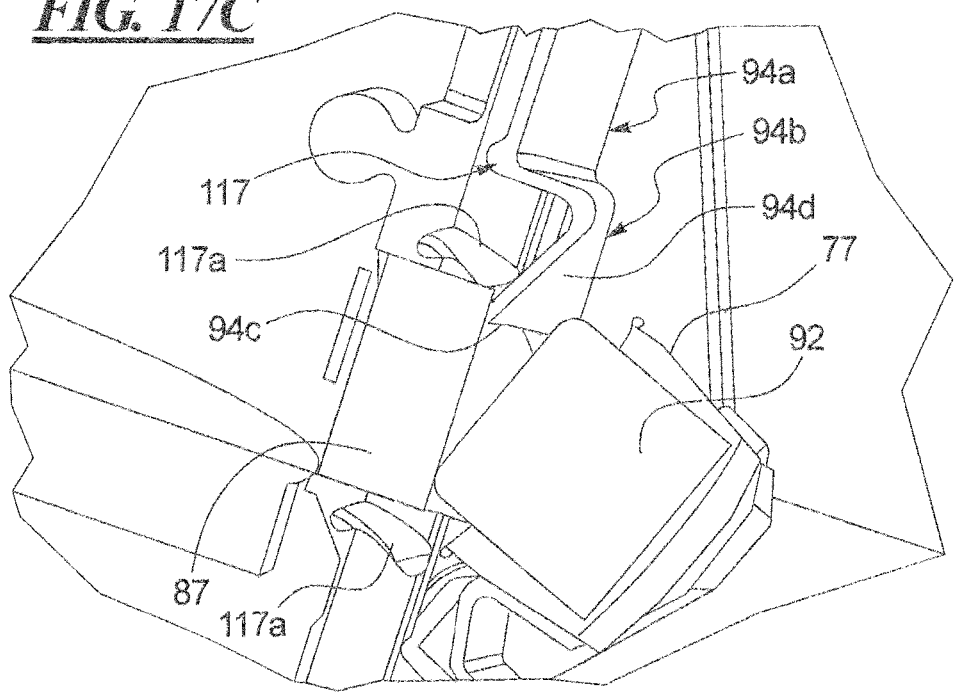

FIGS. 17B-17F illustrate yet another scheme for ensuring that a scoop or serving 92 of ice cream is released from the plow 87 and into the cup 77. As shown in FIG. 17B, a modified door 94a includes a lower blade 94b with curved lower end 94c (FIGS. 17C-17F) and concave lower front surface 94 D. The lower edge 94c is used to engaged a scoop 92 and dislodge it from the plow 87 thereby causing a scoop 92 to drop into the cup 77.

Figure 17D:
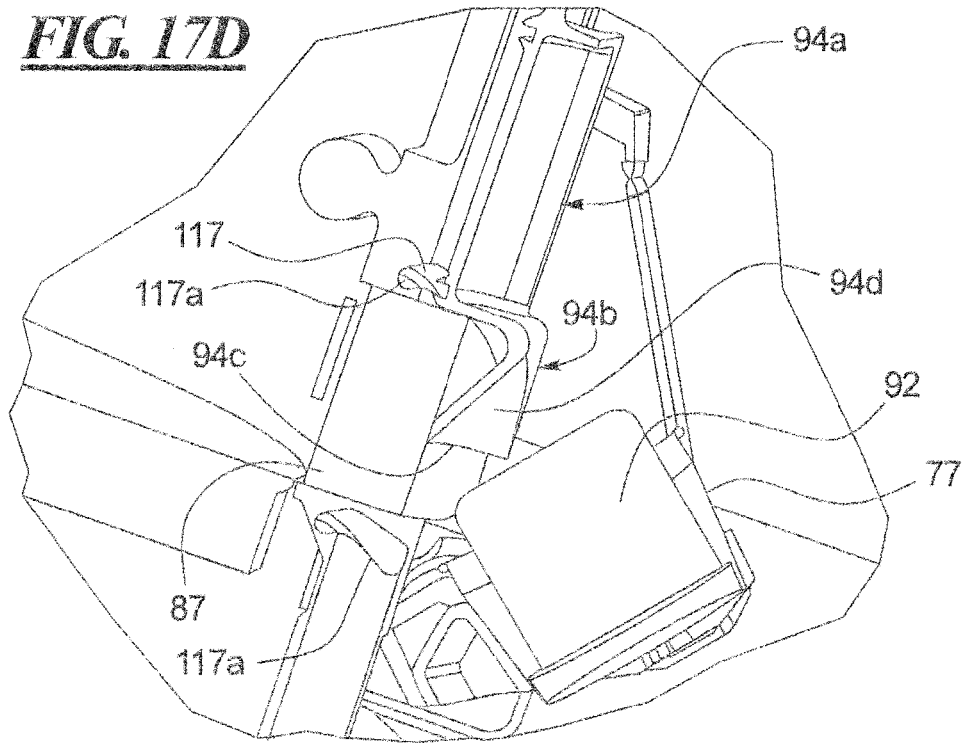
Figure 17E:
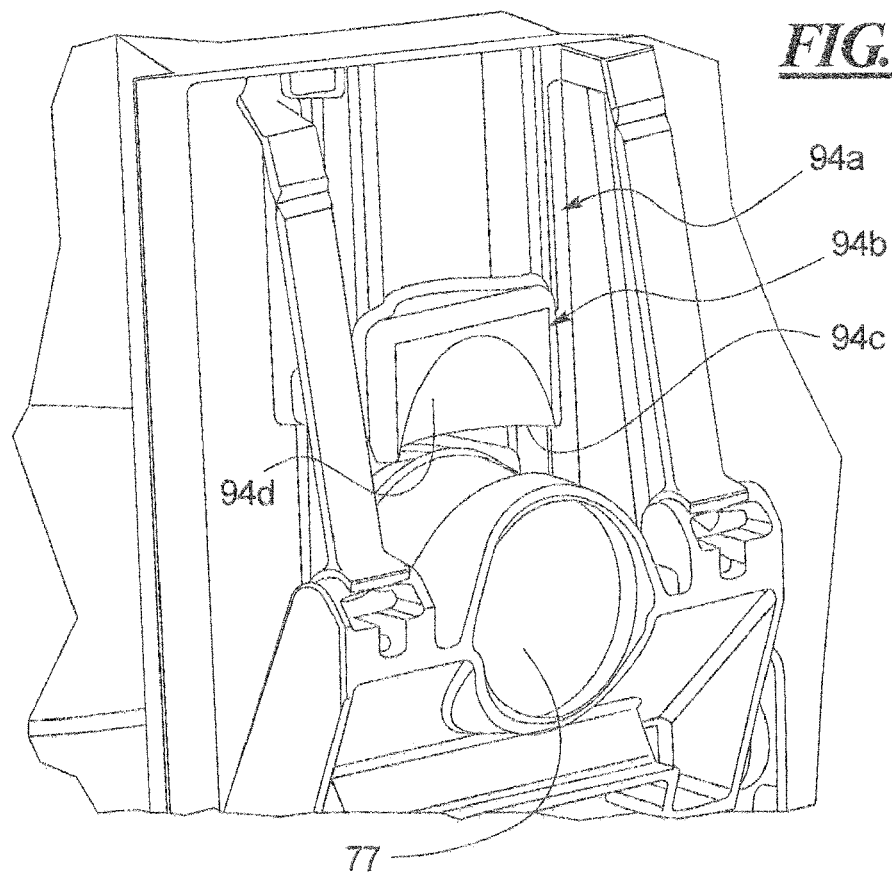
Figure 17F:
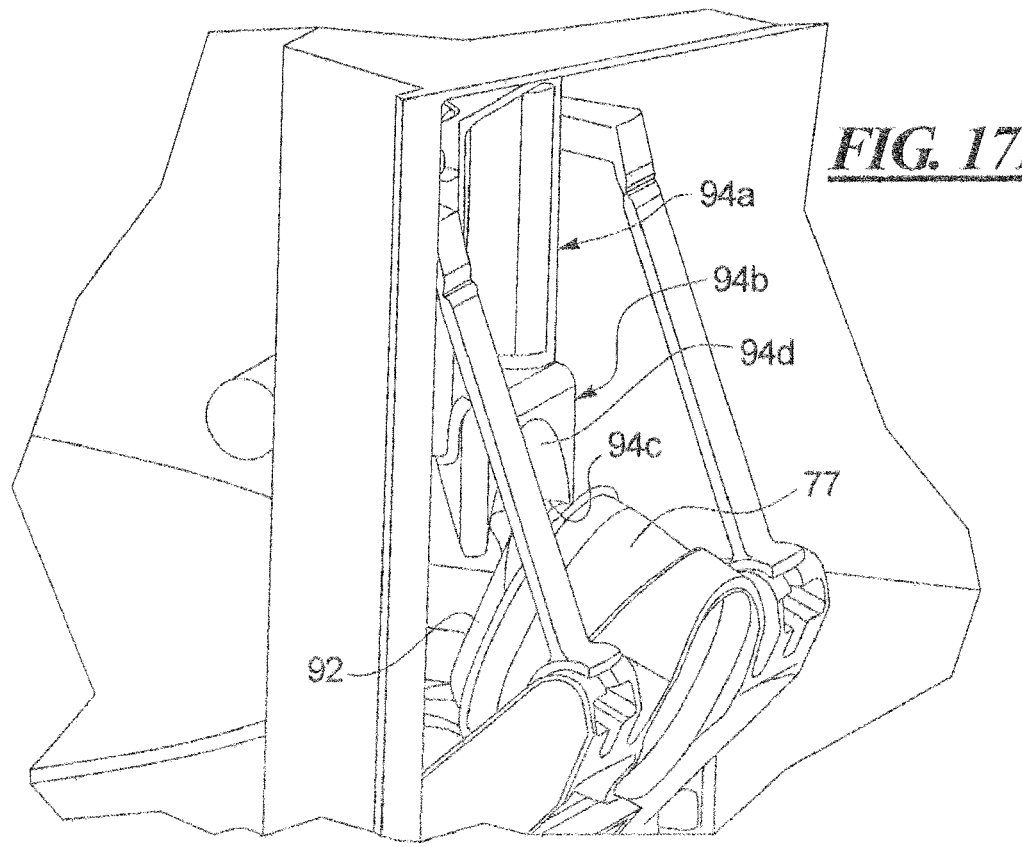

In operation, after the plow 87 packs the scoop 92 to the cup 77 (FIG. 17E), the system goes into a short delay which helps cause the scoop 92 to become dislodged from the face of the plow 87. Then, the door 94a is lowered as the freeze plate 45 begins to rotate for the cleaning cycle and the spreader body 61 is lowered so that its bottom surface 89 engages the top surface 73 of the rotating freeze plate 45. As the door 94a is lowered (FIGS. 17C and 17F) the plow 87 is retracted a short distance to accommodate the lower edge 94c of the door 94a (FIG. 17D). Subsequently, the door 94a is lowered all the way to the closed position (FIG. 17B) and the face of the plow 87 is cleaned by the wiper elements 117 are on the door 94a and the door 94a is cleaned by the wiper elements 117a disposed in the recesses 117b of the frame 98 (FIG. 15A).

Thus, one method of operating the disclosed machine 30 to avoid the scoop 92 sticking to the plow 87 comprises: pushing a scoop 92 into the cup 77 by extending the plow 87; instituting a short delay of any retraction on movement of the plow 87, which sometimes causes dislodgement of the scoop 97 from the face of the plow 87; contemporaneously begin a short retraction of the plow 87 and lowering of the door 94a; engaging any portion of the scoop 92 still adhering to the plow 87 with the lower edge 94c of the door 94a; retract the plow 87 to a cleaning position where the face of the plow 87 is in position to be wiped by the wiper elements 117 on the door 94a; lowering the door 94a to clean the plow 87 with the wiper elements 117 of the door 94a; and complete the retraction of the plow 87 through the channel 75 in preparation for the next dispense.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. An apparatus for making and dispensing frozen aerated products comprising:
   a rotating horizontal freeze plate comprising an upper surface for receiving a chilled aerated mix thereon;
   a spreader body for distributing the chilled aerated mix on the rotating freeze plate, the spreader body comprising a spreader edge that extends radially across at least a portion of the upper surface of the freeze plate, the spreading edge comprising at least one support for supporting the spreading edge above the upper surface of the freeze plate by a gap that defines a height of the distributed chilled aerated mix;
   a scraper for scraping frozen aerated mix off of the rotating freeze plate, the scraper comprising a scraper blade with a leading edge that extends radially across the portion of the freeze plate and that engages the upper surface of the freeze plate and is directed opposite a direction of travel of the freeze plate, the scraper further comprising a body that, with the scraper blade, forms a channel for the collection of scraped, frozen and aerated mix, the channel extending across the portion of the upper surface of the freeze plate and being defined by the scraper blade and a curved inverted u-shaped wall that extends from the scraper blade to a distal edge disposed above the freeze plate
   a plow for pushing the scraped, frozen and aerated mix through the channel towards a cup held by a cup lifter disposed at an end of the channel.

2. The apparatus of claim 1 wherein the scraper and the spreader body are uniformly biased against the upper surface of the freeze plate by a pre-loaded hold-down plate.

3. The apparatus of claim 2 wherein the hold-down plate is connected to and extends between two vertical posts disposed on diametrically opposed sides of the freeze plate, each post being connected to a vertical cam, the vertical cams moving the posts and hold-down plate from a released position for disassembly and cleaning to a clamped position for making the scoop.

4. The apparatus of claim 3 wherein the vertical cams are disposed beneath the freeze plate and are linked together by a pulley and lever system whereby both cams are moved simultaneously from the released to the clamped positions and vice versa upon the movement of the lever.

5. The apparatus of claim 1 wherein the cup lifter comprises a cup holder comprising a front side and a rear side, the rear side of the cup holder being pivotally connected to a frame, the frame comprising an opening in alignment with the channel of the scraper, the front side of the cup holder being linked to a door that covers the channel when the cup lifter is in a first position, the door being slidably connected to the frame and movable to a second position above the opening and causing the cup holder to pivot upward in alignment with and covering the opening with a cup when a cup is received in the cup holder.

6. The apparatus of claim 5 wherein the door comprises a wiper element for wiping the plow when the door moves from the second to the first positions and when the plow is disposed at the opening in the frame after the plow has pushed the product into the cup.

7. The apparatus of claim 1 wherein the spreader body further comprises a cleaning edge, the spreader body being pivotally connected to a rod, the spreader body being movable between a spreading position where the spreading edge engages the upper surface of the freeze plate and a cleaning position where both the cleaning edge and spreading edge engage the upper surface of the freeze plate.

8. The apparatus of claim 7 wherein the spreading edge comprises a spreader blade disposed between two rounded end supports, the spreader blade being recessed with respect to the rounded end supports wherein, in the spreading position, the spreader blade is supported above the upper surface of the freeze plate by the rounded end supports.

9. The apparatus of claim 7 wherein the spreading edge comprises a spreader blade that comprises three spaced-apart rounded supports, the spreader blade being recessed with respect to the rounded supports wherein, in the spreading position, the spreader blade is supported above the upper surface of the freeze plate by the rounded supports.

10. The apparatus of claim 7 wherein when the spreader body moves from the cleaning position to the spreading position, the rod moves vertically upward thereby causing the cleaning edge to pivot upward away from the freeze plate as the spreader body engages an abutment that holds the spreading edge against the upper surface of the freeze plate in the spreading and cleaning position.

11. The apparatus of claim 7 wherein the abutment comprises at least one downwardly extending spring-biased foot.

12. The apparatus of claim 7 wherein the abutment comprises a resilient member.

13. The apparatus of claim 7 wherein when the spreader body moves from the cleaning position to the spreading position, the rod moves vertically upward thereby causing the cleaning edge to pivot upward away from the freeze plate as the spreader body is biased downward against the upper surface of the freeze plate in the spreading and cleaning positions.

14. The apparatus of claim 13 further comprising at least a first magnet connected to the spreader body adjacent to the spreader edge and at least a second magnet having an opposite polarity to the first magnet and that is mounted above the spreader body and first magnet for biasing the spreader edge of the spreader body downward against the upper surface of the rotating freeze plate.

15. The apparatus of claim 1 wherein the freeze plate, scraper and plow are disposed within a liner, the liner comprising a drain for the release of cleaning water and debris.

16. The apparatus of claim 1 further comprising a frame, the frame supporting a first insulated compartment for the storage of base material of the mix,
   the frame supporting a second insulated compartment for accommodating the freeze plate, scraper, spreader body and plow, the first and second insulated compartments being in communication with a first compressor for maintaining the first and second insulated compartments within a first temperature range,
   the freeze plate being linked to a second compressor.

17. The apparatus of claim 16 further comprising a third compartment for accommodating flavorings, the third compartment in communication with the first and second compartments for maintaining the third compartment within a second temperature range that is higher than the first temperature range.

18. The apparatus of claim 16 wherein communication between the first and second compartments is provided by a first baffled conduit, communication between the second and third compartments is provided by a second baffle conduit, and communication between the first and third compartments is provided by a third baffled conduit.

19. The apparatus of claim 16 wherein the frame further supports a fourth compartment for housing electronic components, the third compartment comprising a vent for releasing heat.

20. The apparatus of claim 16 wherein the second compartment further accommodates a desiccant canister for humidity and frost reduction.

21. The apparatus of claim 20 wherein the second compartment is connected to a blower by a one-way valve permitting air from the blow to enter the second compartment from the blower, the second compartment further comprises an outer window that isolates the second compartment and maintains the second compartment at a pressure greater than one atmosphere during the making of the scoop of frozen, scraped aerated mix.

22. An apparatus for making and dispensing frozen aerated products comprising:
a frame supporting first and second insulated compartments, the first insulated compartment for a storage of base material of a mix, the second insulated compartment for accommodating a rotatable freeze plate, scraper, spreader body, plow and a dispense outlet for delivering chilled aerated mix to an upper surface of the freeze plate, the first and second insulated compartments being in communication with a first compressor for maintaining the first and second insulated compartments within a first temperature range, the freeze plate being linked to a second compressor;
the spreader body for distributing the chilled aerated mix on the rotating freeze plate, the spreader body comprising a spreader edge that extends radially across at least a portion of the upper surface of the freeze plate and being supported above the freeze plate by a fixed gap;
a scraper for scraping frozen aerated mix off of the freeze plate, the scraper comprising a scraper blade with a leading edge that extends radially across the portion of the freeze plate and that engages the upper surface of the freeze plate, the scraper further comprising a body that, with the scraper blade, forms an elongated semi-cylindrical channel above the scraper blade and that extends radially across and above the freeze plate for the collection of scraped, frozen and aerated mix, the plow for pushing the scraped, frozen and aerated mix through the channel towards a cup held by a cup lifter disposed at an end of the channel.

23. The apparatus of claim 22 further comprising a third compartment for accommodating flavorings, the third compartment in communication with the first and second compartments for maintaining the third compartment within a second temperature range that is higher than the first temperature range.

24. The apparatus of claim 23 wherein communication between the first and second compartments is provided by a first baffled conduit, communication between the second and third compartments is provided by a second baffled conduit, and communication between the first and third compartments is provided by a third baffled conduit.

25. The apparatus of claim 24 wherein the frame further supports a fourth compartment for housing electronic components, the third compartment comprising a vent for releasing heat.

26. The apparatus of claim 22 wherein the scraper and the spreader body are uniformly biased against the upper surface of the freeze plate by a pre-loaded hold-down plate.

27. The apparatus of claim 26 wherein the hold-down plate is connected to and extends between two vertical posts disposed on diametrically opposed sides of the freeze plate, each post being connected to a vertical cam, the vertical cams moving the posts and hold-down plate from a released position for disassembly and cleaning to a clamped position for making the scoop.

28. The apparatus of claim 27 wherein the vertical cams are disposed beneath the freeze plate and are linked together by a pulley and lever system whereby both cams are moved simultaneously from the released to the clamped positions and vice versa upon the movement of the lever.

29. The apparatus of claim 22 wherein the cup lifter comprises a cup holder comprising a front side and a rear side, the rear side of the cup holder being pivotally connected to a frame, the frame comprising an opening in alignment with the channel of the scraper, the front side of the cup holder being linked to a door that covers the channel when the cup lifter is in a first position, the door being slidably connected to the frame and movable to a second position above the opening and causing the cup holder to pivot upward in alignment with and covering the opening with a cup when a cup is received in the cup holder.

30. The apparatus of claim 29 wherein the door comprises a wiper element for wiping the plow when the door moves from the second to the first positions and when the plow is disposed at the opening in the frame after the plow has pushed the product into the cup.

31. The apparatus of claim 30 wherein the door has a lower edge for dislodging scraped frozen aerated mix from the plow as the door is lowered.

32. The apparatus of claim 22 wherein the spreader body comprises a spreading edge and a cleaning edge, the spreader body being pivotally connected to a rod, the spreader body being movable between a spreading position where the spreading edge engages the upper surface of the freeze plate and a cleaning position where both the cleaning edge and spreading edge engage the upper surface of the freeze plate.

33. The apparatus of claim 32 wherein the spreading edge comprises a rounded spreader blade and a plurality of rounded supports, the spreader blade being recessed with respect to the rounded supports wherein, in the spreading position, the spreader blade is supported a fixed distance above the upper edge of the freeze plate by the rounded supports.

34. The apparatus of claim 32 wherein when the spreader body moves from the cleaning position to the spreading position, the rod moves vertically upward thereby causing the cleaning edge to pivot upward away from the freeze plate as the spreader body remains biased against the upper surface of the freeze plate in the spreading and cleaning positions.

35. The apparatus of claim 22 wherein the freeze plate, scraper and plow are disposed within a liner, the liner comprising a drain for the release of cleaning water and debris.

36. The apparatus of claim 22 wherein the second compartment further accommodates a desiccant canister for humidity and frost reduction, and wherein the second compartment is connected to a blower by a one-way valve permitting air from the blow to enter the second compartment from the blower, the second compartment further comprises an outer window that isolates the second compartment and maintains the second compartment at a pressure greater than one atmosphere during the making of the scoop of frozen, scraped aerated mix.

* * * * *